United States Patent
Ishioka

(10) Patent No.: US 8,805,006 B2
(45) Date of Patent: Aug. 12, 2014

(54) INFORMATION PROCESSING DEVICE CONFIGURED TO DETECT A SUBJECT FROM AN IMAGE AND EXTRACT A FEATURE POINT FROM THE SUBJECT, INFORMATION PROCESSING METHOD, PROGRAM AND ELECTRONIC APPARATUS

(75) Inventor: Hideaki Ishioka, Tokyo (JP)

(73) Assignee: Sony Corporation, Tokyo (JP)

(*) Notice: Subject to any disclaimer, the term of this patent is extended or adjusted under 35 U.S.C. 154(b) by 253 days.

(21) Appl. No.: 13/207,676

(22) Filed: Aug. 11, 2011

(65) Prior Publication Data

US 2012/0045099 A1  Feb. 23, 2012

(30) Foreign Application Priority Data

Aug. 19, 2010  (JP) .................... 2010-183876

(51) Int. Cl.
*G06K 9/00* (2006.01)
(52) U.S. Cl.
USPC .................................................. 382/103
(58) Field of Classification Search
USPC .................. 382/100–107; 348/169–171
See application file for complete search history.

(56) References Cited

U.S. PATENT DOCUMENTS

2009/0074255 A1* 3/2009 Holm .................. 382/115
2009/0109178 A1* 4/2009 Kim et al. ............ 345/166
2010/0157080 A1* 6/2010 Kondo ................ 348/222.1

FOREIGN PATENT DOCUMENTS

JP   2004-062658   2/2004
JP   2004-258837   9/2004

* cited by examiner

*Primary Examiner* — Atiba O Fitzpatrick
(74) *Attorney, Agent, or Firm* — K&L Gates LLP

(57) ABSTRACT

An information processing device, method, program, and electronic apparatus are provided for operating an information processing device without a sense of discomfort regardless of a distance between the information processing device and a user. The information processing device, method, program, and electronic apparatus detect a subject from an image and extract a feature point from the subject. The feature point is converted into a coordinate point based on a movement distance of the subject and an image distance. The image distance being a distance between the subject and where the image is captured.

14 Claims, 15 Drawing Sheets

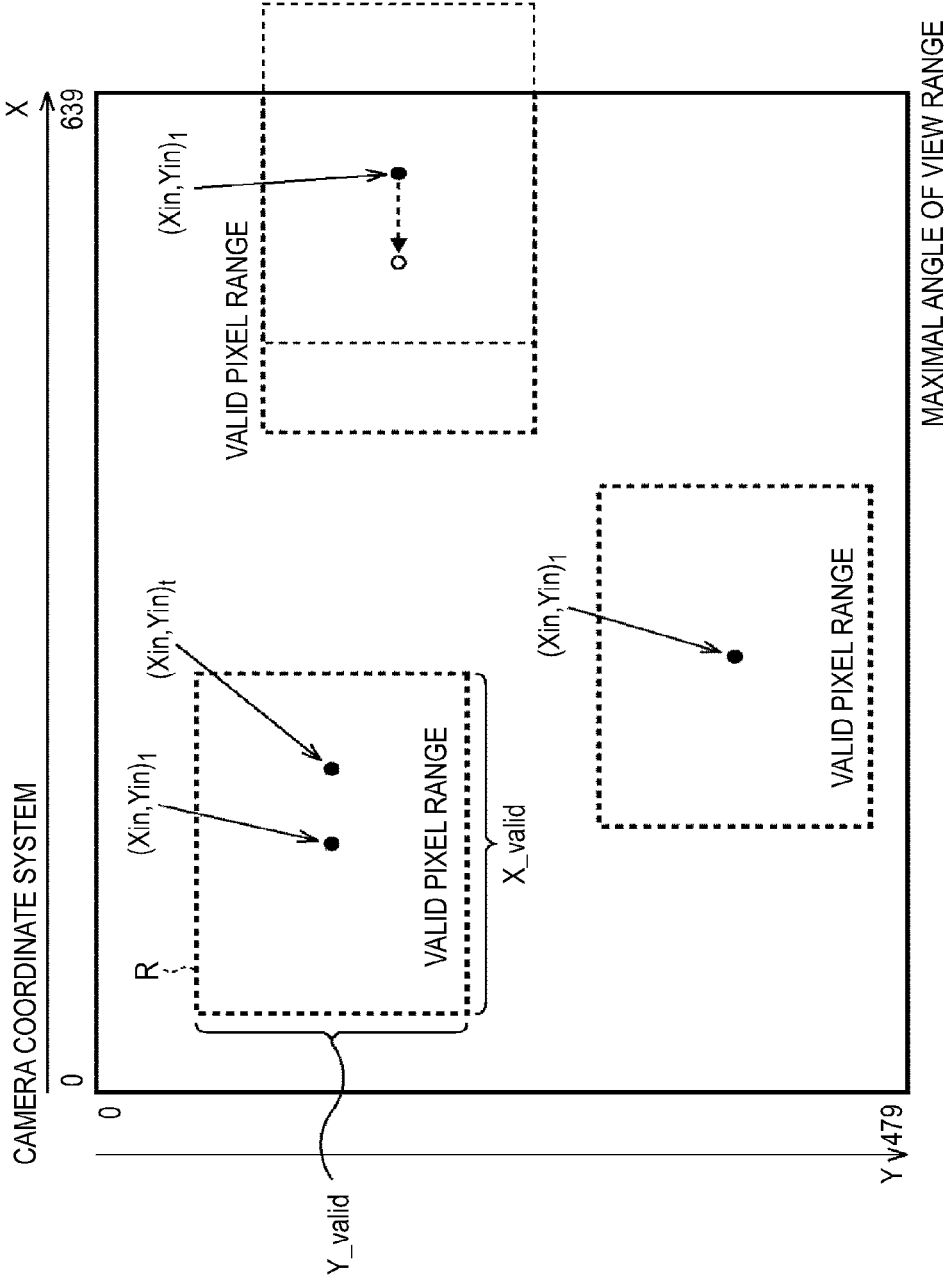

INFORMATION PROCESSING DEVICE CONFIGURED TO DETECT A SUBJECT FROM AN IMAGE AND EXTRACT A FEATURE POINT FROM THE SUBJECT, INFORMATION PROCESSING METHOD, PROGRAM AND ELECTRONIC APPARATUS

CROSS-REFERENCE TO RELATED APPLICATIONS

The present application claims priority to Japanese Patent Application JP 2010-183876, filed in the Japanese Patent Office on Aug. 19, 2010, the entire contents of which is being incorporated herein by reference.

BACKGROUND

The present disclosure relates to an information processing device, an information processing method, a program, and an electronic apparatus, and more particularly to an information processing device, an information processing method, a program, and an electronic apparatus, enabling the information processing device which receives, for example, motion of a user or the like as an input operation, to be operated without a sense of discomfort.

There exists a position detection technique for detecting a three-dimensional (3D) position of a user. In the position detection technique, a 3D position of a user is detected by, for example, a stereo camera process using two cameras (for example, refer to JP-A-2004-258837), or a dedicated indicator is held by a user, and a 3D position of the dedicated indicator is detected as a 3D position of the user (for example, refer to JP-A-2004-062658).

According to the position detection technique, for example, a movement distance of a hand of a user for a predetermined time is calculated based on the 3D position of the user, and a pointer on a display can be moved according to the calculated movement distance.

In addition, there exists a skin detection technique for detecting an area where skin is exposed (hereinafter, referred to as a "skin area") such as the face or a hand of a user on a captured image which is obtained by capturing an image using a camera.

According to the skin detection technique, a 3D position of a hand of a user is calculated based on, for example, a detected skin area corresponding to the hand of the user. A movement amount of the hand of the user in the captured image is calculated based on the calculated 3D position, and a pointer or the like on a display can be moved so as to correspond to the calculated movement amount.

SUMMARY

However, in the above-described position detection technique, detecting a 3D position using two cameras leads to a very large scale device. Further, in the case of detecting a 3D position by holding a dedicated indicator, it is necessary for the user to hold the dedicated indicator, which is very cumbersome.

In the skin detection technique, even if a finger tip is moved the same movement distance, the movement amount of the hand of a user becomes different on a captured image depending on a distance between the camera and the hand.

For this reason, even if the finger tip is moved the same movement distance, a movement amount of the pointer varies depending on the distance between the camera and the hand.

Specifically, for example, even if the user moves the hand the same movement distance, in a case where the distance from the camera to the hand is short, the movement amount of the hand to be moved on the captured image becomes large, and in a case where the distance from the camera to the hand is long, the movement amount of the finger tip to be moved on the captured image becomes small.

For this reason, in the skin detection technique, even if the hand is moved the same movement distance, the movement amount of the hand becomes different on the captured image according to the distance, and, as a result, the movement amount of the pointer becomes different. Therefore, during the user operation there is a great sense of discomfort.

Thus, it is desirable to operate an information processing device without a sense of discomfort regardless of a distance between the information processing device and a user.

In an embodiment, an information processing device includes an image processing device configured to detect a subject from an image and extract a feature point from the subject. The information processing device also includes a coordinate conversion unit configured to convert the feature point into a coordinate point based on a movement distance of the subject and an image distance, wherein the image distance is a distance between the subject and where the image is captured.

In another embodiment of the information processing device, the image processing device includes a skin area detection unit configured to detect a skin area of the subject from the image.

In another embodiment of the information processing device, the information processing device includes a first irradiation unit that irradiates the subject with light having a first wavelength, and a second irradiation unit that irradiates the subject with light having a second wavelength longer than the first wavelength. The information processing device further includes a generation unit that generates a first image based on reflection light from the subject, which is incident when light having the first wavelength is applied to the subject, and generates a second image based on reflection light from the subject, which is incident when light having the second wavelength is applied to the subject. The detection unit detects the skin area of the subject based on the generated first and second images.

In another embodiment of the information processing device, the image processing device includes a distance calculation unit configured to calculate the image distance based on a size of the skin area.

In another embodiment of the information processing device, the image processing device includes a distance calculation unit configured to calculate the image distance based on a luminance value of the skin area.

In another embodiment of the information processing device, the movement distance of the subject is a movement amount of the skin area.

In another embodiment of the information processing device, the coordinate conversion unit determines a conversion coefficient for converting the feature point into the coordinate point, wherein the conversion coefficient is determined based on the image distance.

In another embodiment of the information processing device, the conversion coefficient is proportional to the image distance divided by a reference distance.

In another embodiment of the information processing device, a same movement distance of the subject at different image distances correspond to a same coordinate movement distance in a coordinate space that includes the coordinate point.

In an embodiment, an information processing method includes detecting a subject from an image, extracting a feature point from the subject, and converting, by a coordinate conversion unit, the feature point into a coordinate point based on a movement distance of the subject and an image distance. The image distance is a distance between the subject and where the image is captured.

In an embodiment, a non-transitory computer readable storage medium stores a computer program. The computer program causes an apparatus to detect a subject from an image, extract a feature point from the subject, and convert the feature point into a coordinate point based on a movement distance of the subject and an image distance. The image distance is a distance between the subject and where the image is captured.

In an embodiment, an electronic apparatus includes an information processing device that has an image processing device configured to detect a subject from an image and extract a feature point from the subject. The electronic apparatus also includes a coordinate conversion unit configured to convert the feature point into a coordinate point based on a movement distance of the subject and an image distance. The image distance is a distance between the subject and where the image is captured.

In another embodiment of the electronic apparatus, the electronic apparatus further includes an image capturing device, and the image distance is a distance between the subject and the image capturing device.

According to the embodiments of the present disclosure, it is possible to operate an information processing device without a sense of discomfort regardless of a distance between the information processing device and a user.

Additional features and advantages are described herein, and will be apparent from the following Detailed Description and the figures.

BRIEF DESCRIPTION OF THE DRAWINGS

FIG. 4 is a diagram illustrating a process performed by a coordinate conversion unit.

DETAILED DESCRIPTION

Hereinafter, embodiments of the present disclosure will be described. The description will be made in the following order.

1. The Present Embodiment (an example of a case of mapping coordinates indicating a position of a user on coordinate axes which define coordinates indicating a position of a pointer)

2. Modified Example

1. The Present Embodiment

Configuration Example of Detection Device 21

Figure 1:
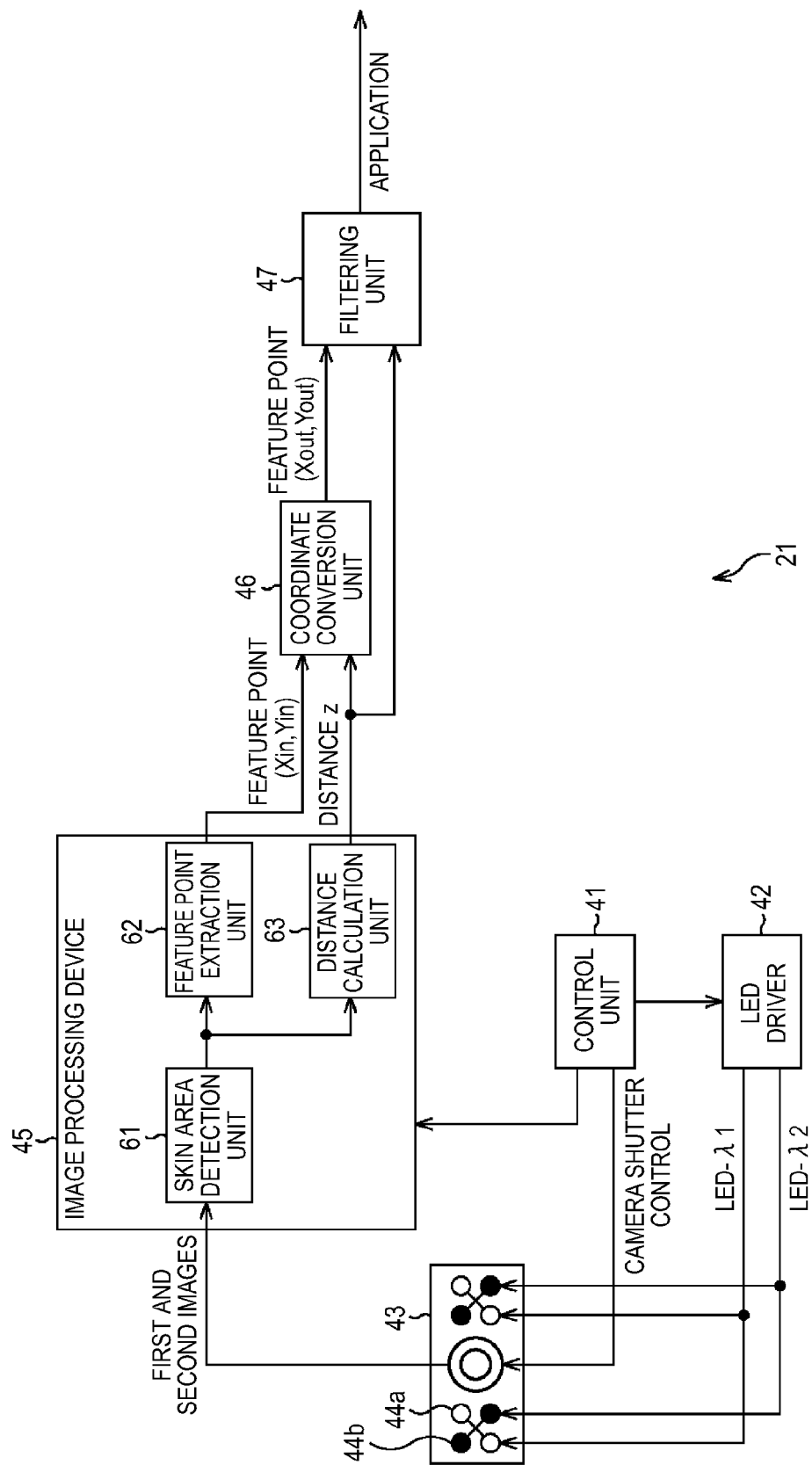
FIG. 1 is a block diagram illustrating a first configuration example of a detection device according to an embodiment of the present disclosure.

FIG. 1 shows a configuration example of a detection device 21 according to the present embodiment.

The detection device 21 detects a skin area (for example, the face, a hand, a finger tip, or the like) of a subject from a captured image. In addition, a 3D position (x, y, z) of the skin area is calculated based on the detected skin area and is converted into a coordinate system which does not depend on the distance z to the skin area.

In addition, the 3D position (x, y, z) is defined on the XYZ coordinate axes which have, for example, an optical axis direction of a condensing lens of a camera 43 as the Z axis, a transverse direction of the camera 43 as the X axis, and a longitudinal direction of the camera 43 as the Y axis.

The detection device 21 includes a control unit 41, an LED (Light Emitting Diode) driver 42, the camera 43, LEDs 44a and 44b, an image processing unit 45, a coordinate conversion unit 46, and a filtering unit 47.

The control unit 41 controls the LED driver 42, the camera 43, the image processing unit 45 and the like. Specifically, for example, the control unit 41 controls image capturing timings of the camera 43, a gain of luminance amplification, and the like.

The LED driver 42 controls a turned-on timing, a turned-off timing, an output level of the LEDs 44a and 44b under the control of the control unit 41.

The camera 43 embeds a condensing lens, imaging elements such as a CCD, a CMOS and the like therein, and generates an image by sensing light reflected from a subject under the control of the control unit 41. An image generated when the LEDs 44a emit light having $\lambda 1$ as the peak wavelength of the emission spectrum (hereinafter, referred to as light with wavelength $\lambda 1$) is referred to as a first image, and an image generated when the LEDs 44b emit light having $\lambda 2$ as the peak wavelength of the emission spectrum (hereinafter, referred to as light with wavelength $\lambda 2$) is referred to as a second image.

The camera 43 supplies the first and second images which are generated by sensing light reflected from a subject, to the image processing unit 45.

The LEDs 44a emit the light with wavelength $\lambda 1$ under the control of the LED driver 42. The LEDs 44b emit the light with wavelength $\lambda 2$ under the control of the LED driver 42.

The values of the wavelength $\lambda 1$ and the wavelength $\lambda 2$ are determined depending on reflection characteristics of human skin. In other words, the wavelengths $\lambda 1$ and $\lambda 2$ are determined depending on the fact that the reflectance is different when the light is applied to human skin, and the reflectance is almost the same when the light is applied to things (for example, hair, clothes, or the like) other than skin.

Specifically, for example, the value of the wavelength λ1 ranges from 640 nm to 1000 nm, and the value of the wavelength λ2 which is longer than the wavelength λ1 ranges from 900 nm to 1100 nm.

The image processing unit 45 detects a skin area of the subject based on the first and second images supplied from the camera 43. The image processing unit 45 calculates a feature point $(x_{in}, y_{in})$ indicating a position of the skin area in the first and second images based on the detected skin area and a distance z between the subject and the camera 43, so as to be supplied to the coordinate conversion unit 46.

In other words, the image processing unit 45 includes a skin area detection unit 61, a feature point extraction unit 62, and a distance calculation unit 63.

The skin area detection unit 61 is supplied with the first and second images from the camera 43. The skin area detection unit 61 calculates a difference S=Y1−Y2 between the luminance values Y1 and Y2 of pixels corresponding to the first and second images from the camera 43, binarizes the difference S through comparison with a predetermined threshold value, and detects one of the binary areas (an area corresponding to the difference S equal to or more than the predetermined threshold value) as the skin area.

The skin area detection unit 61 supplies the detected skin area to the feature point extraction unit 62 and the distance calculation unit 63.

The feature point extraction unit 62 extracts the feature point $(x_{in}, y_{in})$ from the skin area based on the skin area supplied from the skin area detection unit 61 so as to be supplied to the coordinate conversion unit 46. In other words, for example, the feature point extraction unit 62 calculates a centroid of the skin area from the skin area detection unit 61 and supplies the centroid to the coordinate conversion unit 46 as the feature point $(x_{in}, y_{in})$.

The distance calculation unit 63 calculates the distance z to the subject based on the size of the skin area from the skin area detection unit 61 so as to be supplied to the coordinate conversion unit 46 and the filtering unit 47.

The distance calculation unit 63 calculates the distance z to the subject by using the fact that the size of the skin area becomes larger as the distance z to the subject decreases.

In addition, the distance calculation unit 63 may calculate the distance z to the subject by using the fact that a luminance value (for example, an average luminance value or the like) of the skin area becomes larger as the distance between the LEDs 44a or 44b and the subject decreases.

The coordinate conversion unit 46 converts the feature point $(x_{in}, y_{in})$ from the feature point extraction unit 62 into a feature point $(x_{out}, y_{out})$ indicating a position of a pointer on a display (not shown), based on the distance z from the distance calculation unit 63, and supplies the feature point $(x_{out}, y_{out})$ to the filtering unit 47.

The filtering unit 47 performs at least one of filtering for removing noise and filtering for removing camera shake blur for the feature point $(x_{out}, y_{out})$ from the coordinate conversion unit 46, for example, as filtering in the temporal direction.

Specifically, for example, the filtering unit 47 performs filtering for removing noise for the feature point $(x_{out}, y_{out})$ from the coordinate conversion unit 46 using an FIR (Finite Impulse Response) filter or an IIR (Infinite Impulse Response) filter, or performs filtering for removing camera shake blur using nonlinear filtering (for example, a process where the previous feature point $(x_{out}, y_{out})$ is treated as the present point $(x_{out}, y_{out})$ if the movement amount is minute).

The filtering unit 47 outputs the feature point $(x_{out}, y_{out})$ after being filtered to an application.

Also, the filtering unit 47 outputs the distance z from the distance calculation unit 63 to the application.

Thereby, the application side, for example, moves the pointer on the display (not shown) to a position corresponding to the feature point $(x_{out}, y_{out})$ from the filtering unit 47, or determines whether or not a click operation for selecting a position indicated by the pointer depending on the variation in the distance z from the filtering unit 47 is performed, or the like.

In this embodiment, the coordinate conversion unit 46 is provided in the detection device 21, which is the key point of the embodiment of the present disclosure. Therefore, next, the necessity for performing the coordinate conversion using the coordinate conversion unit 46 will be described with reference to FIG. 2, and details of a process performed by the coordinate conversion unit 46 will be described with reference to FIGS. 3A to 5.

Hereinafter, the description of the detection device 21 which calculates a 3D position (x, y, z) of a finger tip of a subject based on a skin area corresponding to the finger tip of the subject will be made.

Example where Movement Amounts are Different Depending on Distance z

Figure 2:
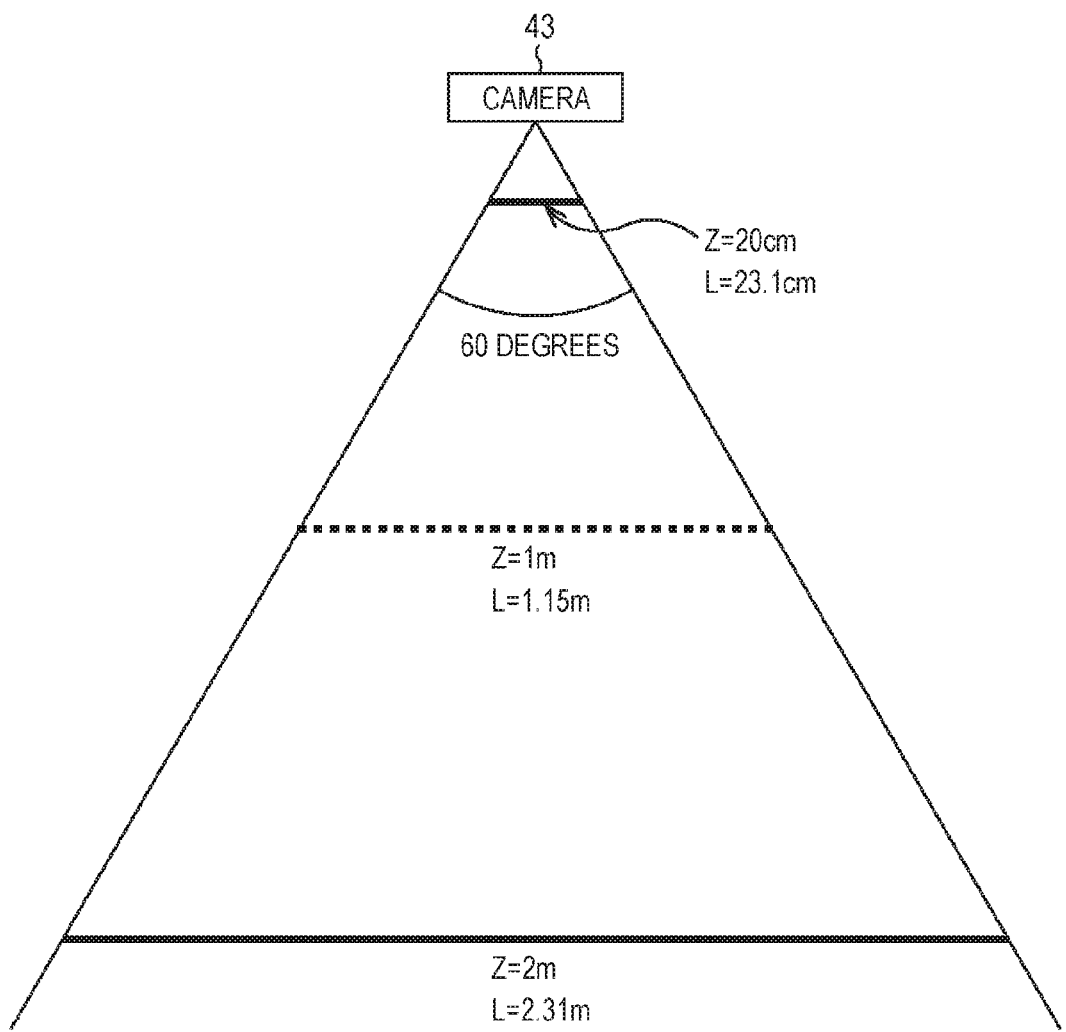
FIG. 2 is a diagram illustrating an example of a case where movement amounts which are different depending on distances are calculated.

FIG. 2 shows a first example where a movement amount of a finger tip in the first and second images, which is calculated for each distance, is different even if the finger tip is moved the same movement distance.

Also, as shown in FIG. 2, an image capturing range of the camera 43 (in the figure, marked with the thick solid lines and the dotted lines) is different depending on the distance z between the camera 43 and a subject. It is assumed that the first and second images obtained by the image capturing of the camera 43 are, for example, images with 640×480 pixels in width×height. Further, it is assumed that the angle of view of the camera 43 in the transverse direction is 60 degrees and the angle of view thereof in the longitudinal direction is 47 degrees.

For example, as shown in FIG. 2, if the distance z between the camera 43 and the subject is 0.2 m (=20 cm), in order to move the finger tip by 640 pixels which is the total number of pixels of the first and second images in the transverse direction in the first and second images, it is necessary to actually move the finger tip in the transverse direction by the movement distance L=0.231 m (=23.1 cm).

In contrast, if the distance z between the camera 43 and the subject is 1 m, in order to move the finger tip by 640 pixels in the first and second images, it is necessary to actually move the finger tip in the transverse direction by the movement distance L=1.15 m.

In addition, for example, if the distance z between the camera 43 and the subject is 2 m, in order to move the finger tip by 640 pixels in the first and second images, it is necessary to actually move the finger tip in the transverse direction by the movement distance L=2.31 m.

Therefore, even if the finger tip is moved by the same movement distance L, the finger tips in the first and second images obtained by the image capturing of the camera 43 are not moved by the same number of pixels at any distance z in the first and second images.

In other words, if the finger tip is moved by the movement distance Q m, for example, in the case of the distance z between the camera 43 and the subject is 0.2 m, a movement amount in the X direction from a feature point $(x_{in}, y_{in})_{t-1}$ when the finger tip starts being moved to a feature point $(x_{in}, y_{in})_t$ when the finger tip finishes being moved is the movement amount corresponding to p pixels. In addition, the feature point $(x_{in}, y_{in})_t$ indicates the feature point $(x_{in}, y_{in})$ which is extracted in the t-th continuously from the skin area.

In contrast, in the case of the distance z between the camera 43 and the subject is 1 m, a movement amount in the X direction from a feature point $(x_{in}, y_{in})_{t-1}$ to a feature point $(x_{in}, y_{in})_t$ becomes a distance of p/5 pixels.

Therefore, if the distance z between the camera 43 and the subject is 0.2 m, the movement amount is recognized as p pixels, whereas if the distance z between the camera 43 and the subject is 1 m, the movement amount is recognized as p/5 pixels.

For this reason, for example, in a case where a pointer is moved according to the movement amount of the finger tip to be moved in the first and second images obtained from the camera 43, even if the finger tip is moved by the same movement distance Q m, the movement amount of the pointer displayed on the display (not shown) becomes different depending on the distance z.

Therefore, in the embodiment of the present disclosure, for example, if the finger tip is moved by the movement distance Q m, the movement amount in the X direction is recognized as p pixels regardless of the distance z.

In this way, in the embodiment of the present disclosure, the pointer on the display can be moved by the same movement amount the same movement distance Q m regardless of the distance z.

FIGS. 3A to 3D show an outline of the embodiment of the present disclosure.

Figure 3A:
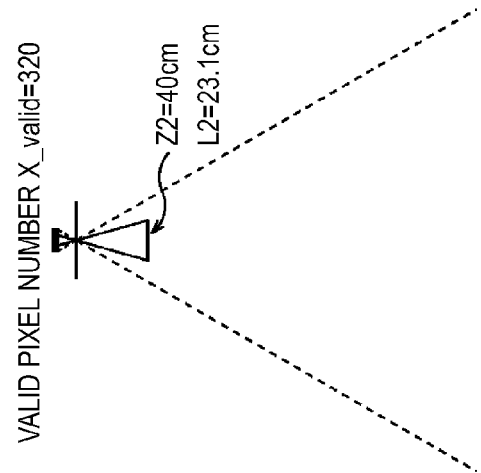
FIGS. 3A to 3D are diagrams illustrating an outline of an embodiment of the present disclosure.

As shown in FIG. 3A, if the distance z between the camera 43 and the subject is 0.2 m (=20 cm), the movement distance L which is necessary to move the finger tip by the movement amount of the 640 pixels which is an movement amount from the end to the end in the transverse direction in the first and second images is 0.231 m (=23.1 cm). It is assumed that the first and second images are, for example, images of 640×480 pixels in width×height.

In this embodiment, it is assumed that the movement amount where the finger tip is moved in the first and second images, for example, in the case where the distance z between the camera 43 and the subject is 0.2 m is the movement amount of the pointer as it is, in the application side.

In other words, if the finger tip is moved by the movement distance L=0.231 m at any distance z, the coordinate conversion unit 46 performs the coordinate conversion such that the movement amount where the finger tip is moved in the first and second images becomes the movement amount of 640 pixels.

If the distance z between the camera 43 and the subject is 0.2 m, the movement amount in the X direction from the feature point $(x_{in}, y_{in})_{t-1}$ to the feature point $(x_{in}, y_{in})_t$ becomes p pixels when the finger tip is moved by the movement distance Q m.

Therefore, the coordinate conversion unit 46 outputs the feature point $(x_{in}, y_{in})_t$ from the feature point extraction unit 62 to the application side via the filtering unit 47 as the feature point $(x_{out}, y_{out})_t$ without being converted.

The application side recognizes the movement amount of the finger tip of the subject as the movement amount of p pixels based on the feature point $(x_{out}, y_{out})_t$ from the filtering unit 47 and moves the pointer by p pixels in the X direction.

Also, if the distance z between the camera 43 and the subject is 0.4 m (=40 cm), the movement amount in the X direction from the feature point $(x_{in}, y_{in})_{t-1}$ to the feature point $(x_{in}, y_{in})_t$ becomes p/2 pixels when the finger tip is moved by the movement distance Q m.

Figure 3B:
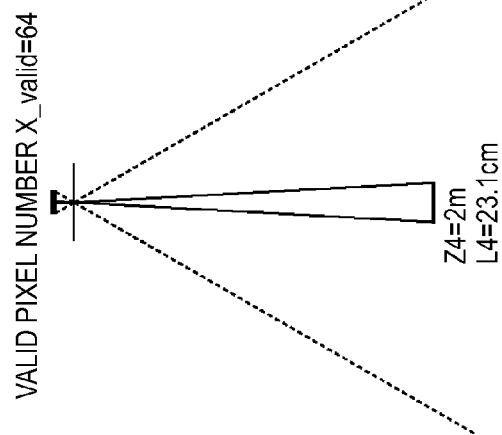

Thus, for example, the coordinate conversion unit 46, as shown in FIG. 3B, determines a valid pixel range where a valid pixel number X_valid in the X direction becomes 320 as the valid pixel range including the feature point $(x_{in}, y_{in})_{t-1}$ and the feature point $(x_{in}, y_{in})_t$.

Thereby, if the distance z between the camera 43 and the subject is 0.4 m, the movement distance L necessary to move the finger tip from end to end in the transverse direction in the valid pixel range which has been determined on the first and second images becomes 0.231 m.

In addition, the valid pixel range is an area including the number of pixels of X_valid×Y_valid (width×height), and Y_valid is the number of valid pixels in the Y direction. However, Y_valid is a value proportional to X_valid, and thus only X_valid will be described.

The coordinate conversion unit 46 converts the determined valid pixel range into an image where the valid pixel number X_valid becomes 640, that is, an image having the same size as the first and second images, through interpolation of pixels. Thereby, the feature point $(x_{in}, y_{in})_{t-1}$ and the feature point $(x_{in}, y_{in})_t$ in the valid pixel range are respectively converted into the feature point $(x_{out}, y_{out})_{t-1}$ and the feature point $(x_{out}, y_{out})_t$.

In this case, in the converted image, the movement amount in the X direction from the feature point $(x_{out}, y_{out})_{t-1}$ to the feature point $(x_{out}, y_{out})_t$ becomes p pixels. Therefore, the application side recognizes the movement amount of the finger tip of the subject as a distance of p pixels based on the feature point $(x_{out}, y_{out})_t$ from the filtering unit 47 and moves the pointer by p pixels in the X direction.

Further, if the distance z between the camera 43 and the subject is 1 m, the movement amount in the X direction from the feature point $(x_{in}, y_{in})_{t-1}$ to the feature point $(x_{in}, y_{in})_t$ becomes p/5 pixels.

Figure 3C:
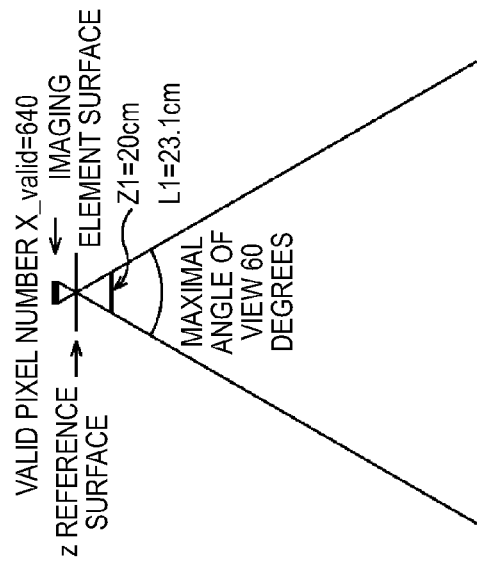

Thus, for example, the coordinate conversion unit 46, as shown in FIG. 3C, determines a valid pixel range where a valid pixel number X_valid in the X direction becomes 128 as the valid pixel range including the feature point $(x_{in}, y_{in})_{t-1}$ and the feature point $(x_{in}, y_{in})_t$.

Thereby, if the distance z between the camera 43 and the subject is 1 m, the movement distance L necessary to move the finger tip from the end to the end in the transverse direction in the valid pixel range which has been determined on the first and second images becomes 0.231 m.

The coordinate conversion unit 46 converts the determined valid pixel range (X_valid=128) into an image where the valid pixel number X_valid becomes 640. Thereby, the feature point $(x_{in}, y_{in})_{t-1}$ and the feature point $(x_{in}, y_{in})_t$ in the valid pixel range are respectively converted into the feature point $(x_{out}, y_{out})_{t-1}$ and the feature point $(x_{out}, y_{out})_t$. In this case, the movement distance in the X direction from the feature point $(x_{out}, y_{out})_{t-1}$ to the feature point $(x_{out}, y_{out})_t$ becomes a distance of p pixels. Therefore, the application side recognizes the movement amount of the finger tip of the subject as p pixels based on the feature point $(x_{out}, y_{out})_t$ from the filtering unit 47 and also moves the pointer by p pixels.

Further, if the distance z between the camera 43 and the subject is 2 m, the movement amount in the X direction from the feature point $(x_{in}, y_{in})_{t-1}$ to the feature point $(x_{in}, y_{in})_t$ becomes p/10 pixels.

Figure 3D:
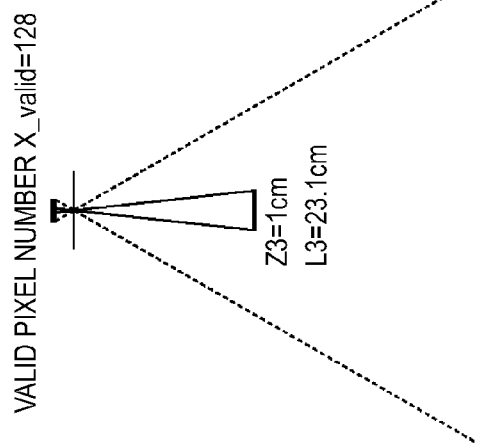

Thus, for example, the coordinate conversion unit 46, as shown in FIG. 3D, determines a valid pixel range where a valid pixel number X_valid in the X direction becomes 64 as the valid pixel range including the feature point $(x_{in}, y_{in})_{t-1}$ and the feature point $(x_{in}, y_m)_t$.

Thereby, if the distance z between the camera 43 and the subject is 2 m, the movement distance L necessary to move the finger tip from the end to the end in the transverse direction in the valid pixel range which has been determined on the first and second images becomes 0.231 m.

The coordinate conversion unit 46 converts the determined valid pixel range (X_valid=64) into an image where the valid pixel number X_valid becomes 640. Thereby, the feature point $(x_{in}, y_{in})_{t-1}$ and the feature point $(x_{in}, y_{in})_t$ in the valid pixel range are respectively converted into the feature point $(x_{out}, y_{out})_{t-1}$ and the feature point $(x_{out}, y_{out})_t$ on the converted image. In this case, the movement distance in the X direction from the feature point $(x_{out}, y_{out})_{t-1}$ to the feature point $(x_{out}, y_{out})_t$ becomes a distance of p pixels. Therefore, the application side recognizes the movement amount of the finger tip of the subject as p pixels based on the feature point $(x_{out}, y_{out})_t$ from the filtering unit 47 and also moves the pointer by p pixels.

In this way, the detection device 21 obtains a movement amount of the finger tip in the first and second images based on the feature point $(x_{out}, y_{out})_{t-1}$ and the feature point $(x_{out}, y_{out})_t$ obtained after being converted, instead of the feature point $(x_{in}, y_{in})_{t-1}$ and the feature point $(x_{in}, y_{in})_t$ in the valid pixel range, and moves the pointer according to the movement amount of the finger tip.

Next, a process performed by the coordinate conversion unit 46 will be described with reference to FIG. 4.

The coordinate conversion unit 46 determines the valid pixel range according to the distance z from the distance calculation unit 63 as shown in FIG. 4.

In other words, for example, the coordinate conversion unit 46, as shown in the top left part of FIG. 4, determines the size of the valid pixel range R, that is, the number of pixels of width×height=X_valid×Y_valid, according to the distance z from the distance calculation unit 63. A method for determining the size of the valid pixel range R will be described later with reference to FIG. 5.

In addition, the coordinate conversion unit 46 sets the determined valid pixel range on the first image or the second image so as to put the feature point $(x_{in}, y_{in})_1$ from the feature point extraction unit 62 at the centroid thereof.

The valid pixel range is newly determined each time the distance z from the distance calculation unit 63 varies. The centroid of the valid pixel range is a centroid of the feature point $(x_{in}, y_{in})_1$ which is initially extracted after the distance has varied.

If the application makes a requirement of image data obtained by converting, for example, a set valid pixel range into the range of 640×480 which is the size of the first and second images, the coordinate conversion unit 46 may convert the set valid pixel range into the 640×480 range which is the size of the first and second images, and supply the image data obtained as a result thereof to the application via the filtering unit 47.

The coordinate conversion unit 46 converts the feature point $(x_{in}, y_{in})_t$ from the feature point extraction unit 62 into the feature point $(x_{out}, y_{out})_t$ using the following equations (1) and (1)'.

$$x_{out}=(x_{in}-x\_\text{offset1})\times z/0.2+x\_\text{offset2} \quad (1)$$

$$y_{out}=(y_{in}-y\_\text{offset1})\times z/0.2+y\_\text{offset2} \quad (1)'$$

In the equation (1), x_offset1 indicates x of the central position (x, y) in a valid pixel range, and, for example, is $x_{in}$ of the feature point $(x_{in}, y_{in})_1$. In addition, x_offset2 indicates an x coordinate of the central position (x, y) in the first and second images, and, for example, is $x_{out}$ of the converted feature point $(x_{out}, y_{out})_1$. In the equation (1)', y_offset1 indicates y of the central position (x, y) in a valid pixel range, and, for example, is $y_{in}$ of the feature point $(x_{in}, y_{in})_1$. In addition, y_offset2 indicates a y coordinate of the central position (x, y) in the first and second images, and, for example, is $y_{out}$ of the converted feature point $(x_{out}, y_{out})_1$.

In the equation (1), the conversion coefficient z/0.2 which is multiplied by $(x_{in}-x\_\text{offset1})$ is a coefficient which is multiplied for converting $x_{in}$ into $x_{out}$. In addition, in the equation (1)', the conversion coefficient z/0.2 which is multiplied by $(y_{in}-y\_\text{offset1})$ is a coefficient which is multiplied for converting $y_{in}$ into $y_{out}$. Since this case uses the feature point $(x_{in}, y_{in})$ obtained in the case where the distance z is 0.2 m as a reference, the conversion coefficient is a value obtained by dividing the distance z by the distance z=0.2 which is a reference.

Therefore, it is possible to convert the feature point $(x_{in}, y_{in})_t$ on the XY coordinates which have the feature point $(x_{in}, y_{in})_1$ indicating the center (centroid) of the valid pixel range as the origin, into the feature point $(x_{out}, y_{out})_t$ on the XY coordinates which have the center of the first and second images including 480×640 pixels as the origin. The equation (1)' is the same as the equation (1), thus only the equation (1) will be described, and the description of the equation (1)' will be appropriately omitted.

As shown in the bottom left part of FIG. 4, a valid pixel range is set at different positions depending on the position of the feature point $(x_{in}, y_{in})_1$.

The coordinate conversion unit 46 converts the feature point $(x_{in}, y_{in})_t$ extracted from the set valid pixel range into the feature point $(x_{out}, y_{out})_t$ which is supplied to the filtering unit 47.

In addition, as shown in the top right part of FIG. 4, in a case where the valid pixel range to be set is not entirely included in the first and second images, the centroid of the valid pixel range to be set is shifted so as to include the entire valid pixel range.

In other words, for example, as shown in the top right part of FIG. 4, if a portion of the valid pixel range is not included in the captured image (if a portion of the valid pixel range is missing), the coordinate conversion unit 46 may add a predetermined value to x_offset1 which is $x_{in}$ of the feature point $(x_{in}, y_{in})_1$ and shift $x_{in}$ (=x_offset1) of the center $(x_{in}, y_{in})_1$ of the valid pixel range.

In this case, since the valid pixel range is entirely included in the captured image, it is possible to prevent a portion of an image corresponding to the valid pixel range from being missing in a case where the valid pixel range is enlarged to the size of the first and second images and then is received by the application side.

In addition, x_offset1 has been described, but, this can be performed for y_offset1 on the Y axis in the same manner.

Method for Determining Size of Valid Pixel Range

Figure 5:
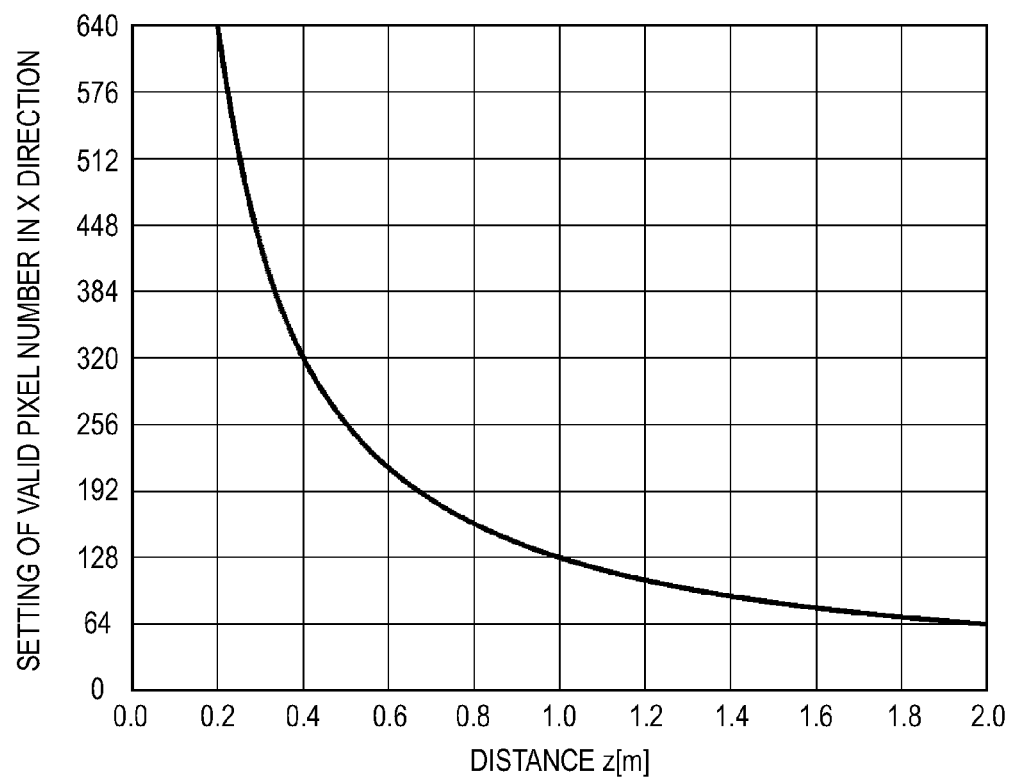
FIG. 5 is a first diagram illustrating a relationship between a distance and a valid pixel range.

Next, a process where the coordinate conversion unit 46 determines a size of the valid pixel range will be described with reference to FIG. 5. FIG. 5 shows a relationship between the distance z and the valid pixel range.

The coordinate conversion unit 46 determines the valid pixel number X_valid of the valid pixel range in the X direction based on the distance z from the distance calculation unit 63 as shown in FIG. 5. In the same manner, the coordinate conversion unit 46 determines the valid pixel number Y_valid of the valid pixel range in the Y direction based on the distance z from the distance calculation unit 63.

The valid pixel number X_valid and the valid pixel number Y_valid are determined by the same method, thus only a case of determining the valid pixel number X_valid will be described, and description of a case of determining the valid pixel number Y_valid will be omitted in the figures after FIG. 5. This is also the same for the subsequent description.

The coordinate conversion unit 46 determines the valid pixel number X_valid of the valid pixel range in the X direction using the correspondence relationship as shown in FIG. 5, based on a table which maintains the distance z in correlation with the valid pixel number X_valid, a function which is used to calculate the valid pixel number X_valid by using the distance z as a variable, or the like.

The shorter the distance z is, the larger the size or the luminance value of a skin area detected by the skin area detection unit 61 is. Therefore, the coordinate conversion unit 46 may determine the valid pixel number X_valid of the valid pixel range in the X direction by the use of the size or the luminance value of the skin area detected by the skin area detection unit 61 instead of the distance z from the distance calculation unit 63.

Specifically, for example, the coordinate conversion unit 46 may determine the valid pixel number X_valid of the valid pixel range in the X direction using the correspondence relationship as shown in FIG. 5, based on a table which maintains the size or the luminance value of a skin area in correlation with the valid pixel number X_valid, a function which is used to calculate the valid pixel number X_valid by using the size or the luminance value of a skin area as a variable, or the like. This is also the same for FIGS. 7, 8 and 10 described later.

In FIG. 5, the transverse axis indicates the distance z, and the longitudinal axis indicates the valid pixel number X_valid in the X direction. The valid pixel number X_valid in the X direction is given by the following equation (2).

$$X\_valid = 640 \times 0.2/z \qquad (2)$$

In the equation (2), the number of pixels 640 in the X direction indicates the number of pixels in the X direction in an image supplied to the application side. In addition, a scaling gain 0.2/z which is the reciprocal of the conversion coefficient z/0.2 is used to calculate the valid pixel number X_valid in the X direction. Specifically, for example, the scaling gain 0.2/z is multiplied by the number of pixels 640 in the X direction in an image supplied to the application side as shown in the equation (2).

The coordinate conversion unit 46, as shown in FIG. 5, calculates the valid pixel number X_valid in the X direction corresponding to the distance z from the distance calculation unit 63. The coordinate conversion unit 46 calculates the valid pixel number Y_valid in the Y direction corresponding to the distance z from the distance calculation unit 63 in the same manner.

The coordinate conversion unit 46 sets the valid pixel range R including the calculated number of pixels of X_valid× Y_valid (width×height) to a position having the feature point $(x_{in}, y_{in})_1$ as the centroid, as described with reference to FIG. 4. The coordinate conversion unit 46 converts only the feature point $(x_{in}, y_{in})_t$ existing in the valid pixel range R into the feature point $(x_{out}, y_{out})_t$.

Description of Operation of Detection Device 21

Figure 6:
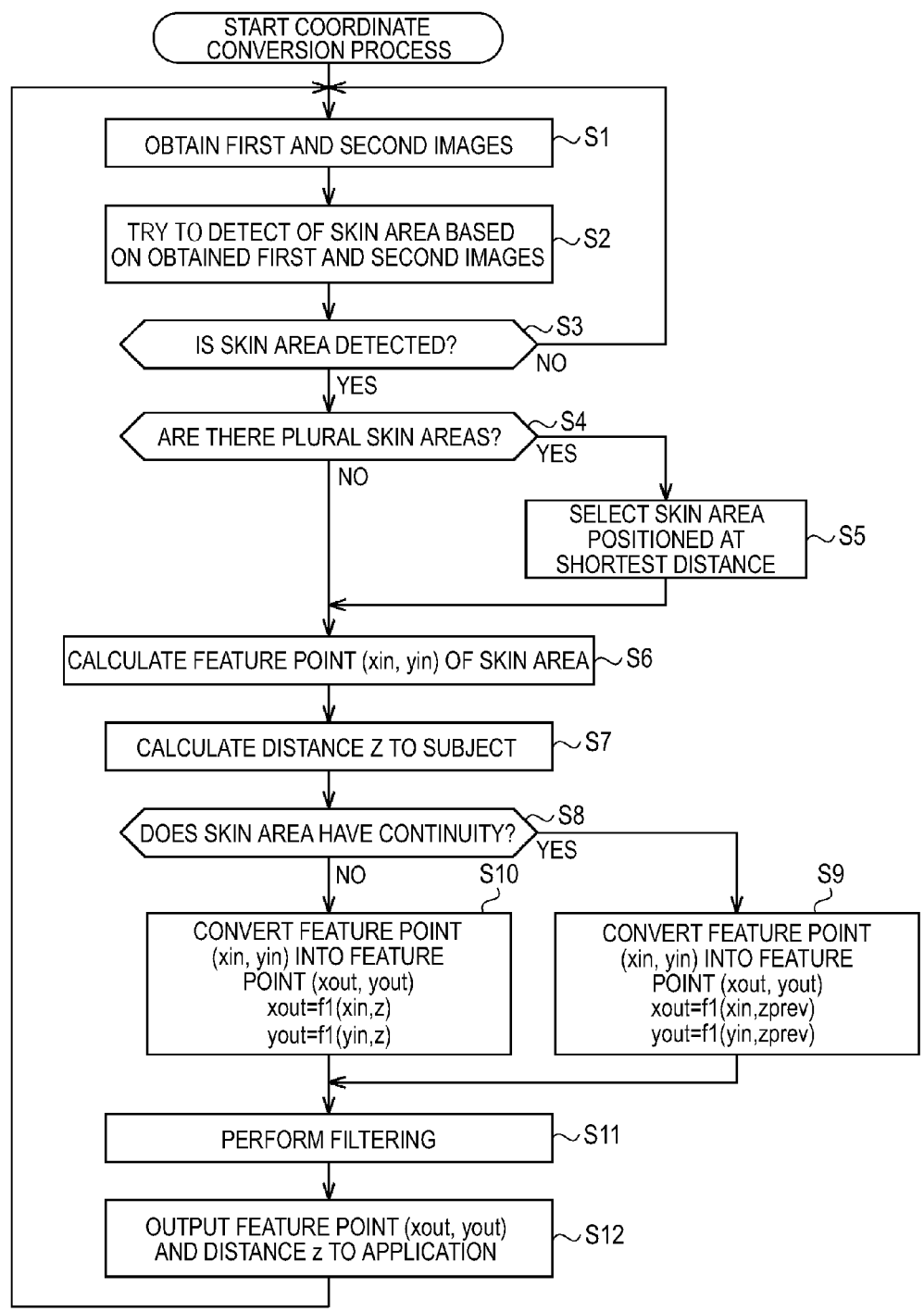
FIG. 6 is a flowchart illustrating a coordinate conversion process performed by the detection device.

Next, a coordinate conversion process performed by the detection device 21 will be described with reference to the flowchart in FIG. 6.

This coordinate conversion process starts, for example, when the detection device 21 is powered on.

At this time, for example, the LEDs 44a irradiate the subject with light having wavelength λ1 under the control of the LED driver 42. The applied light is reflected by the subject along with external light and is incident to the camera 43. The camera 43 generates the first image by performing photoelectric conversion for the incident light and supplies the first image to the skin area detection unit 61, under the control of the control unit 41.

Next, the LEDs 44b irradiate the subject with light having wavelength λ2 under the control of the LED driver 42. The applied light is reflected by the subject along with external light and is incident to the camera 43. The camera 43 generates the second image by performing photoelectric conversion for the incident light and supplies the second image to the skin area detection unit 61, under the control of the control unit 41.

In step S1, the skin area detection unit 61 obtains the first and second images supplied from the camera 43.

In step S2, the skin area detection unit 61 calculates a difference S=Y1−Y2 between the luminance values Y1 and Y2 of pixels corresponding to the obtained first and second images, and binarizes the difference S through comparison with a predetermined threshold value. The skin area detection unit 61 tests detection of a skin area based on the binary values obtained by the binarization.

If one of the binary areas (an area corresponding to the difference S equal to or more than the predetermined threshold value) is present, the skin area detection unit 61 detects the area as the skin area.

In step S3, the skin area detection unit 61 determines whether or not the skin area can be detected based on the processed result in step S2, and if it is determined that the skin area is not detected, the flow returns to step S1, and the processes are performed by the same method thereafter.

In step S3, if the skin area detection unit 61 determines that the skin area can be detected based on the processed result in step S2, the flow goes to step S4.

In step S4, the skin area detection unit 61 determines whether or not a plurality of skin areas are detected based on the processed result in step S2, and if it is determined that the plurality of skin areas are detected, the flow goes to step S5.

The skin area detection unit 61 selects a skin area existing at the shortest distance z among the plurality of skin areas based on the sizes, the luminance values of the skin areas, or the like, as a target skin area, and supplies the target skin area to the feature point extraction unit 62 and the distance calculation unit 63, and the flow goes to step S6.

The skin area detection unit 61 selects the skin area existing at the shortest distance z among the plurality of skin areas as the target skin area by the use of the fact that the shorter the distance z is, the larger the corresponding size or luminance value (for example, an average luminance value or the like) is.

In addition, in step S4, if it is determined that a plurality of skin areas are not detected, that is, a single skin area is detected based on the processed result in step S2, the skin area detection unit 61 selects the single skin area as a target skin area which is supplied to the feature point extraction unit 62 and the distance calculation unit 63, and the flow goes to step S6.

In step S6, the feature point extraction unit 62 extracts a feature point $(x_{in}, y_{in})_t$ of the target skin area based on the target skin area from the skin area detection unit 61 so as to be supplied to the coordinate conversion unit 46.

In step S7, the distance calculation unit 63 calculates a distance $z_t$ between the detection device 21 and the subject corresponding to the target skin area based on the size or the luminance value of the target skin area from the skin area detection unit 61 so as to be supplied to the coordinate conversion unit 46 and the filtering unit 47. The distance $z_t$ indicates the distance z which is calculated in the t-th continuously from the skin area.

In step S8, the coordinate conversion unit 46 determines whether or not the detected skin area has continuity (whether or not the skin area is continuously detected) based on whether or not, for example, the distance $z_t$ is continuously supplied from the distance calculation unit 63 (or whether or not the feature point $(x_{in}, y_{in})_t$ is supplied from the feature point extraction unit 62). If the coordinate conversion unit 46 determines that the detected skin area has continuity (a case of t≥2), the flow goes to step S9. Here, t indicates the number to be continuously detected.

The coordinate conversion unit 46 converts the feature point $(x_{in}, y_{in})_t$ from the feature point extraction unit 62 into the feature point $(x_{out}, y_{out})_t$ using a distance $z_{prev}$ calculated in previous step S7, that is, a distance $z_{t-1}$ calculated by the distance calculation unit 63, and supplies the feature point $(x_{out}, y_{out})_t$ to the filtering unit 47.

In addition, in step S8, if it is determined that the detected skin area has no continuity (a case of t=1), the flow goes to step S10, and the coordinate conversion unit 46 converts the feature point $(x_{in}, y_{in})_1$ from the feature point extraction unit 62 into the feature point $(x_{out}, y_{out})_t$ using the distance $z_1$ from the distance calculation unit 63, and supplies the feature point $(x_{out}, y_{out})_1$ to the filtering unit 47.

In step S11, the filtering unit 47 performs filtering for removing noise for the feature point $(x_{out}, y_{out})_t$ from the coordinate conversion unit 46 using, for example, an FIR filter or an IIR filter, or performs filtering for removing camera shake blur using nonlinear filtering (for example, a process where the previous feature point $(x_{out}, y_{out})_{t-1}$ is treated as this feature point $(x_{out}, y_{out})_t$ if the movement amount is minute).

In step S12, the filtering unit 47 outputs the feature point $(x_{out}, y_{out})_t$ after being filtered and the distance $z_t$ from the distance calculation unit 63 to the application as a 3D position $(x_{out}, y_{out}, z)_t$ of the subject corresponding to the target skin area. The flow returns to step S1 and the processes are performed by the same method thereafter. The coordinate conversion process finishes, for example, when the detection device 21 is powered off.

As described above, through the coordinate conversion process, the feature point $(x_{in}, y_{in})_{t-1}$ and the feature point $(x_{in}, y_{in})_t$ in the valid pixel range are converted into the feature point $(x_{out}, y_{out})_{t-1}$ and the feature point $(x_{out}, y_{out})_t$.

Therefore, it is possible to detect the movement amount corresponding to the movement distance of the finger tip based on the feature point $(x_{out}, y_{out})_{t-1}$ and the feature point $(x_{out}, y_{out})_t$, for example, regardless of the distance z. For this reason, it is possible to move the pointer by the movement amount corresponding to the movement distance of the finger tip, for example, regardless of the distance z.

2. Modified Example

Method for Determining Valid Pixel Number X_valid

Figure 7:
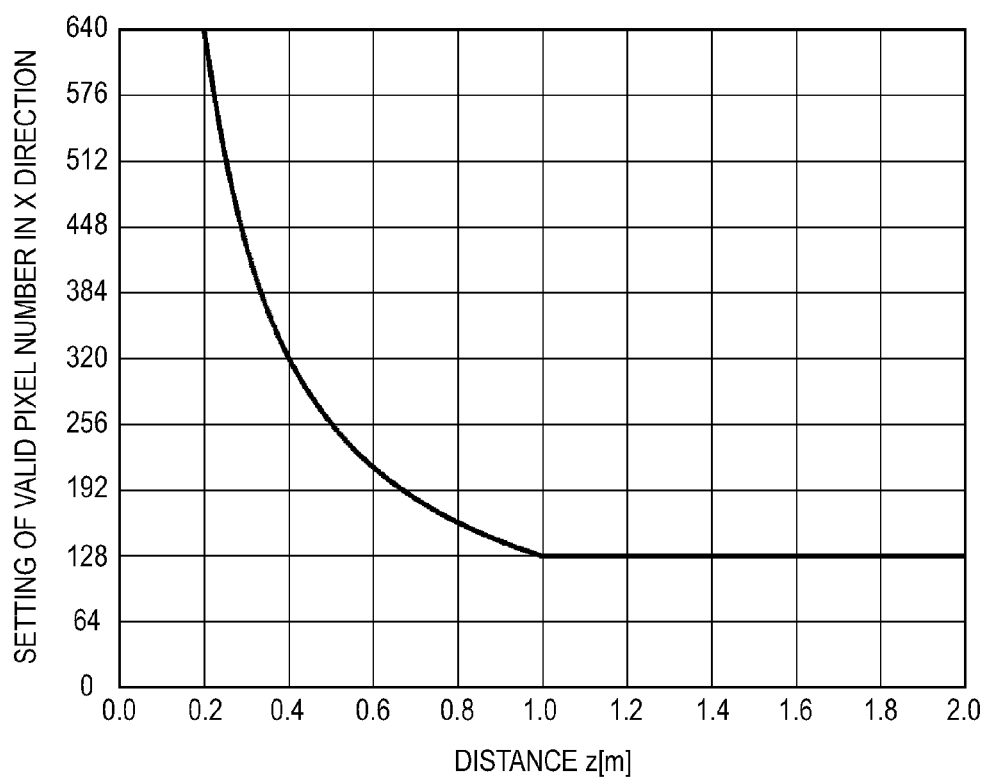
FIG. 7 is a second diagram illustrating a relationship between a distance and a valid pixel range.

Although the coordinate conversion unit 46 determines the valid pixel number X_valid as shown in FIG. 5 in the embodiment, for example, as shown in FIG. 7, if the distance z from the distance calculation unit 63 is equal to or more than a predetermined distance, the valid pixel number X_valid may be fixed to a constant value.

Specifically, for example, as shown in FIG. 7, if the distance z from the distance calculation unit 63 is equal to or more than 1 m, the equation (1) may be given by $x_{out}=(x_{in}-x\_offset1)\times 1/0.2+x\_offset2$, and the equation (2) may be given by X_valid=640×0.2/1=128.

In FIG. 7, since the valid pixel number X_valid of the valid pixel range is maintained as 128 even if the distance z is equal to or more than a predetermined distance (for example, 1 m), it is possible to prevent the resolution from decreasing due to the number of pixels constituting the valid pixel range decreasing too much. Thereby, it is possible to prevent detection accuracy of the movement amount of the finger tip from being lowered.

Figure 8:
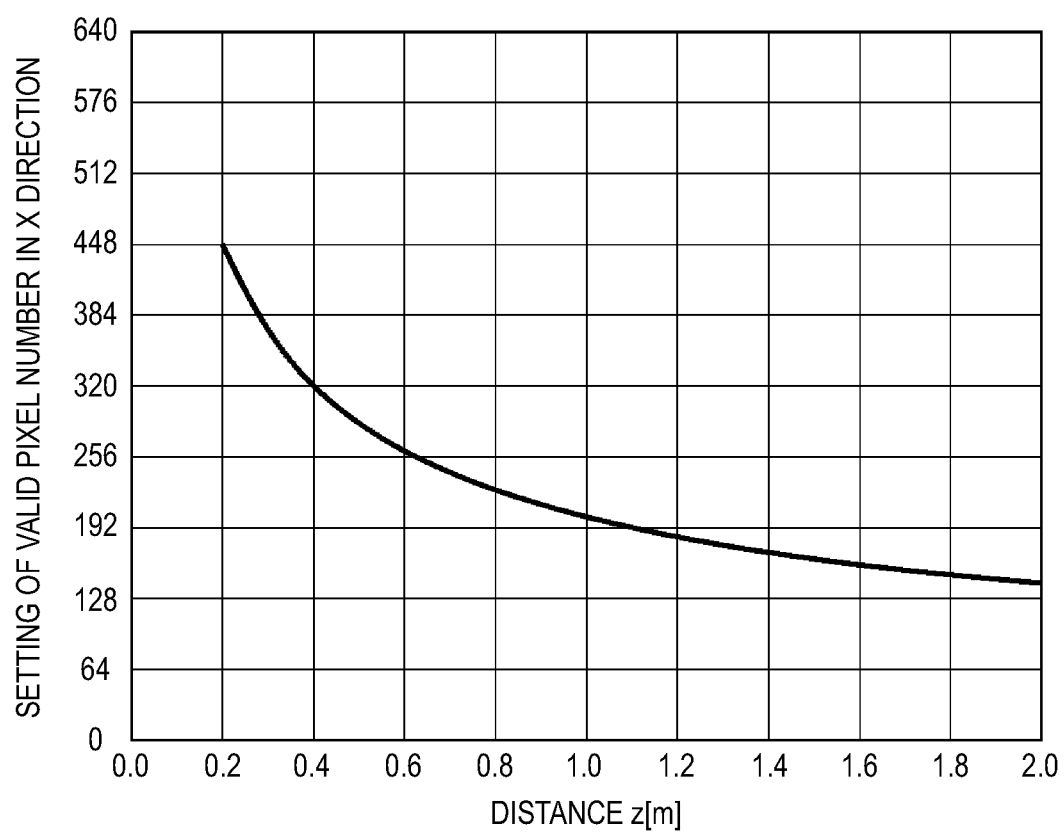
FIG. 8 is a third diagram illustrating a relationship between a distance and a valid pixel range.

For example, as shown in FIG. 8, the valid pixel number X_valid may be largely inversely proportional to the square root of the distance z. In this case, for example, if the distance z is 0.4 m, the valid pixel number X_valid is obtained by multiplying the scaling gain $\{½\times\sqrt{(0.4/z)}\}$ by the number of pixels 640 such that the valid pixel number X_valid becomes 320, as shown in the following equation (3).

$$X\_valid=640\times½\times\sqrt{(0.4/z)} \qquad (3)$$

In a case where the valid pixel number X_valid is determined using equation (3), $x_{out}$ is given by the following equation (4).

$$x_{out}=(x_{in}-x\_offset1)\times 2\times\sqrt{(z/0.4)}+x\_offset2 \qquad (4)$$

In the equation (4), the conversion coefficient which is the reciprocal of the scaling gain is $2\times\sqrt{(z/0.4)}$. This is for converting $x_{in}$ in the valid pixel range having the valid pixel number X_valid=$320\times\sqrt{(z/0.4)}$ in the X direction into $x_{out}$ in an image where the number of pixels in the X direction is 640 pixels.

Figure 9:
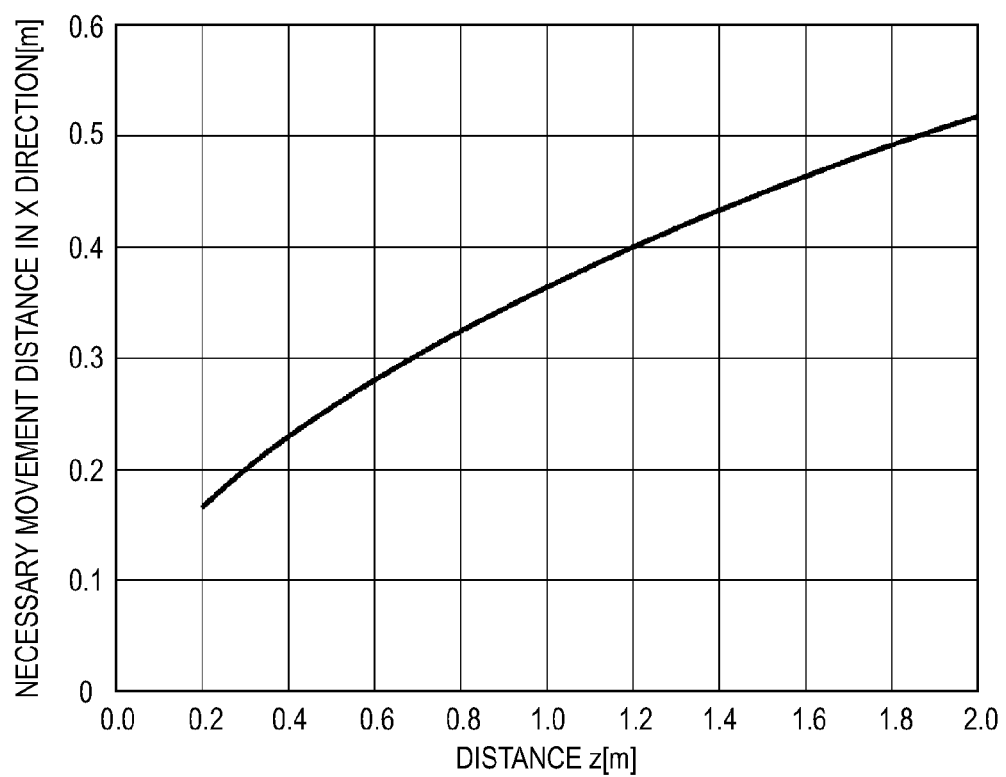
FIG. 9 is a first diagram illustrating a relationship between a distance and a movement distance.

In this case, as shown in FIG. 9, in order to move the pointer from end to end on the first and second images, the movement distance necessary to move the finger tip is 16.3 cm to 51.6 cm at the distance z of 0.2 m to 2 m.

In this way, the movement distance necessary to move the finger tip increases according to the square root of the distance z. Therefore, a user or the like who moves the finger tip, for example, such that the movement distance increases according to the square root of the distance z can have a natural sense of operation when moving the pointer or the like.

In FIG. 8, although the valid pixel number X_valid varies according to the distance z to the power of $-½$ as shown in the equation (3), the present disclosure is not limited thereto. In other words, for example, the valid pixel number X_valid may vary according to the distance z to the power of $-\alpha(0<\alpha\leq 1)$.

In this case, if a value of $\alpha$ for realizing a more natural sense of operation is determined for each user, it is possible to realize a natural sense of operation suitable for each user.

In FIG. 8, since the valid pixel number X_valid of the valid pixel range is suppressed from decreasing even if the distance z is long as compared with the case shown in FIG. 5, it is possible to prevent the resolution from decreasing due to the number of pixels constituting the valid pixel range decreasing too much.

Figure 10:
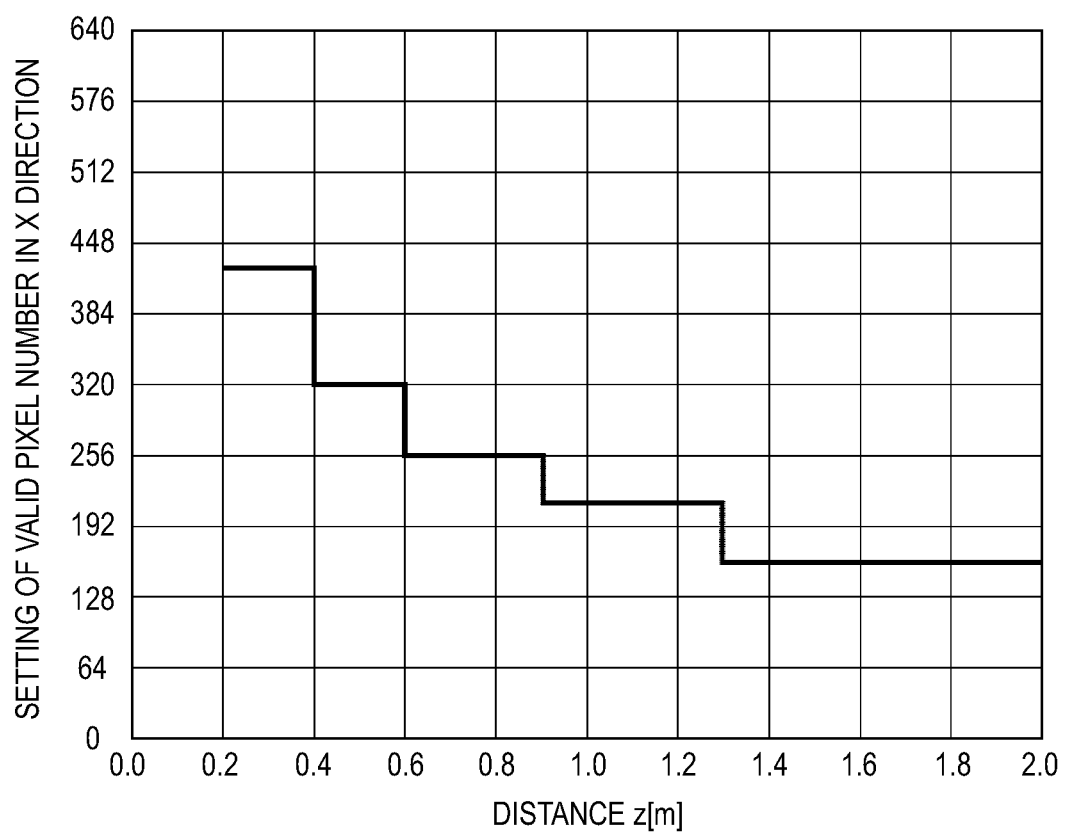
FIG. 10 is a fourth diagram illustrating a relationship between a distance and a valid pixel range.

In addition, as shown in FIG. 10, the valid pixel number X_valid may vary in a stepwise manner according to the distance z. In this case, $x_{out}$ is given by the following equation (5).

$$x_{out}=(x_{in}-x\_offset1)\times(640/X\_valid)+x\_offset2 \qquad (5)$$

In the equation (5), the conversion coefficient is (640/X_valid). In this case, as shown in FIG. 10, the valid pixel number X_valid varies in a stepwise manner according to the distance z. Therefore, the conversion coefficient (640/X_valid) which has the valid pixel number X_valid varying in a stepwise manner as a variable also varies in a stepwise manner.

For example, if the valid pixel number X_valid varies in a stepwise manner such that the conversion coefficient (640/X_valid) becomes a round-number value such as 1.5, 2, 2.5, 3 or 4, it is possible to further increase an operation speed in the equation (5).

Figure 11:
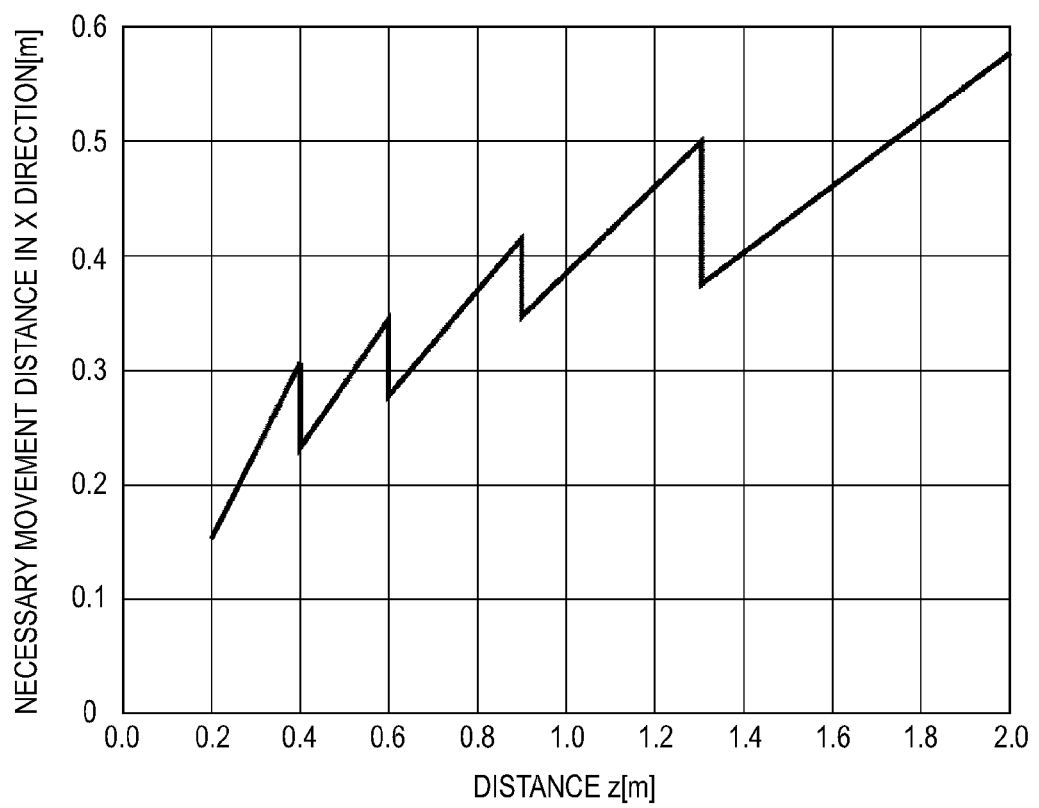
FIG. 11 is a second diagram illustrating a relationship between a distance and a movement distance.

When the case shown in FIG. 10 is employed, the movement distance necessary to move the finger tip in order to move the pointer from end to end on the first and second images varies as shown in FIG. 11.

In the case shown in FIG. 10, for example, as compared with the case where the valid pixel number X_valid continuously varies like in FIG. 5, a frequency of the variations in the valid pixel number X_valid is reduced, and thus it is possible to reduce processes for determining the valid pixel number X_valid and to perform processes more promptly.

Method For Determining x_offset1

Although x_offset1 is $x_{in}$ of the feature point $(x_{in}, y_{in})_1$ as shown in FIG. 4 in this embodiment, x_offset1 is not limited thereto.

Figure 12:
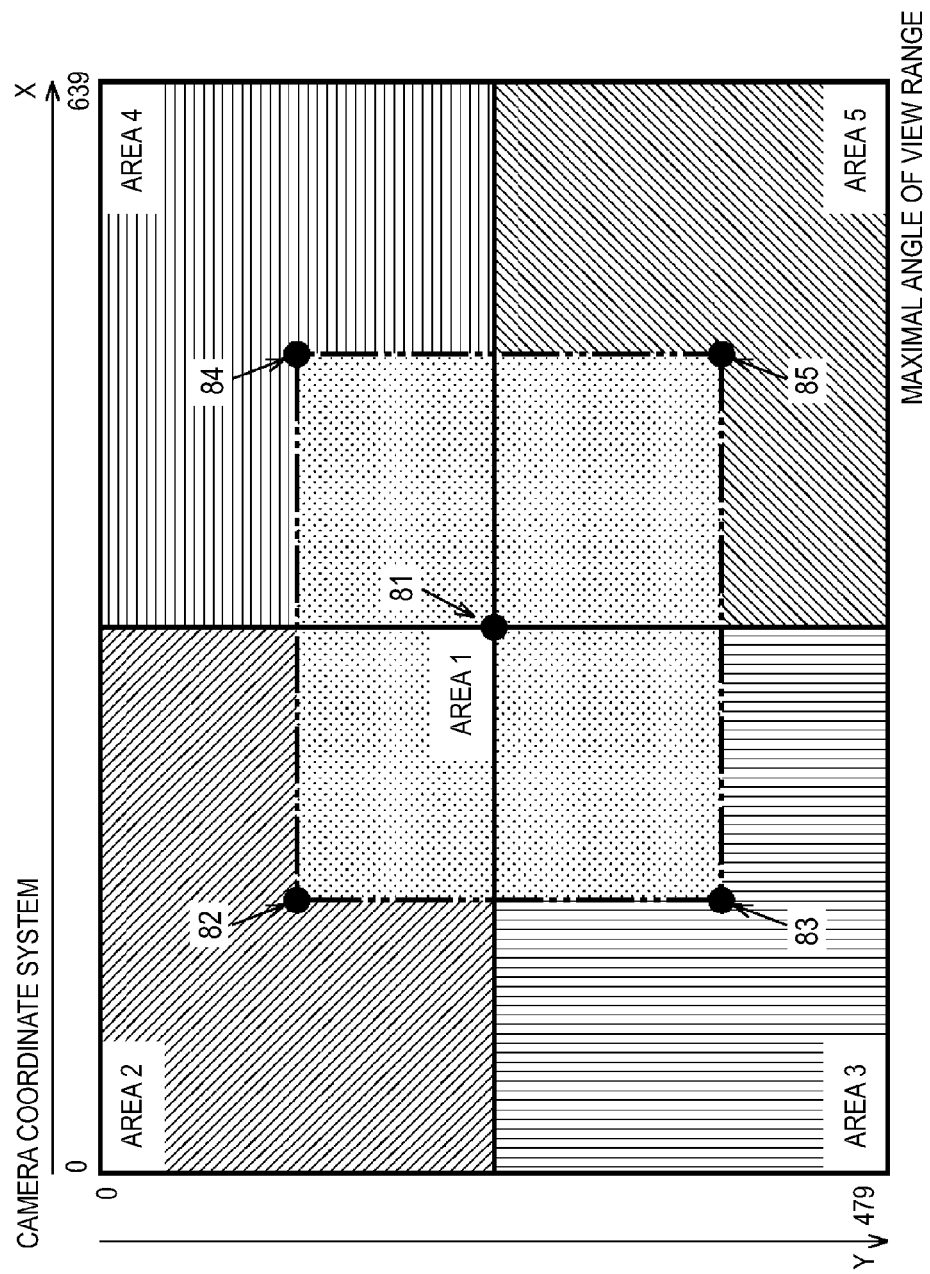
FIG. 12 is a diagram illustrating an example of a case of determining an offset value.

Next, FIG. 12 shows another example of a case of determining x_offset1.

The coordinate conversion unit 46 determines in which area of first to fifth areas on the first and second images the feature point $(x_{in}, y_{in})_1$ exists, and sets x_offset1 as an x value of any one of coordinates 81 to 85 based on the determined result.

In other words, for example, if it is determined that the feature point $(x_{in}, y_{in})_1$ exists in the area 1, the coordinate conversion unit 46 sets x_offset1 to an x value of the coordinate 81, and if it is determined that the feature point $(x_{in}, y_{in})_1$ exists in the area 2, sets x_offset1 to an x value of the coordinate 82, and if it is determined that the feature point $(x_{in}, y_{in})_1$ exists in the area 3, sets x_offset1 to an x value of the coordinate 83.

In addition, if it is determined that the feature point $(x_{in}, y_{in})_1$ exists in the area 4, the coordinate conversion unit 46 sets x_offset1 to an x value of the coordinate 84, and if it is determined that the feature point $(x_{in}, y_{in})_1$ exists in the area 5, sets x_offset1 to an x value of the coordinate 85.

In this case, it is possible to prevent the valid pixel range from protruding out of the first and second images as shown in the top right part of FIG. 4.

Therefore, since the problem as shown in the top right part of FIG. 4 does not occur, it is not necessary to perform the process for shifting x_offset1 by a predetermined value or the like in order to include the valid pixel range in the captured image. For this reason, it is possible to simplify an algorithm for converting the feature points and to convert the feature points more promptly.

In addition, for example, x_offset1 may be determined based on a skin area corresponding to the face. For example, if the skin area detection unit 61 detects a plurality of skin areas, it detects a skin area having the furthest distance z among the plurality of skin areas as a skin area corresponding to the face.

That is to say, for example, the coordinate conversion unit 46 may recognize the skin area having the furthest distance z among the plurality of detected skin areas as an area corresponding to the face, add a predetermined value to a feature point of the skin area corresponding to the face, and set x of a point existing around the neck or the chest of a user obtained as a result thereof as x_offset1. This is also the same for y_offset1. Thereby, a valid pixel range having (x_offset1, y_offset1) as a center indicates a range of the neck or the chest of the user. In addition, y_offset1 in the Y direction is determined in the same manner as x_offset1.

When the user moves the finger tip in order to move the pointer or the like, moving the finger tip in front of the neck or the chest may be the most natural posture. Accordingly, in a case where the center (x_offset1, y_offset1) of the valid pixel range is obtained based on the feature point of the skin area corresponding to the face, the user can operate the pointer or the like in a natural posture, and a sense of operation which the user has is improved.

In addition, the coordinate conversion unit 46 determines the valid pixel number X_valid based on the distance from the distance calculation unit 63 as shown in FIGS. 5, 7, 8 and 10, but the present disclosure is not limited thereto.

In other words, for example, if the size or the luminance value of a skin area is correlated with the valid pixel number X_valid instead of the distance z, the coordinate conversion unit 46 may determine the valid pixel number X_valid based on the size or the luminance value of a skin area supplied from the skin area detection unit 61 via the feature point extraction unit 62. In this case, it is not necessary to calculate the distance z in order to determine the valid pixel number X_valid and it is possible to implement a simpler configuration.

Although the image processing unit 45 detects a skin area from the first and second images supplied from the camera 43 in this embodiment, a method for detecting a skin area is not limited thereto.

Configuration Example of Detection Device 91

Figure 13:
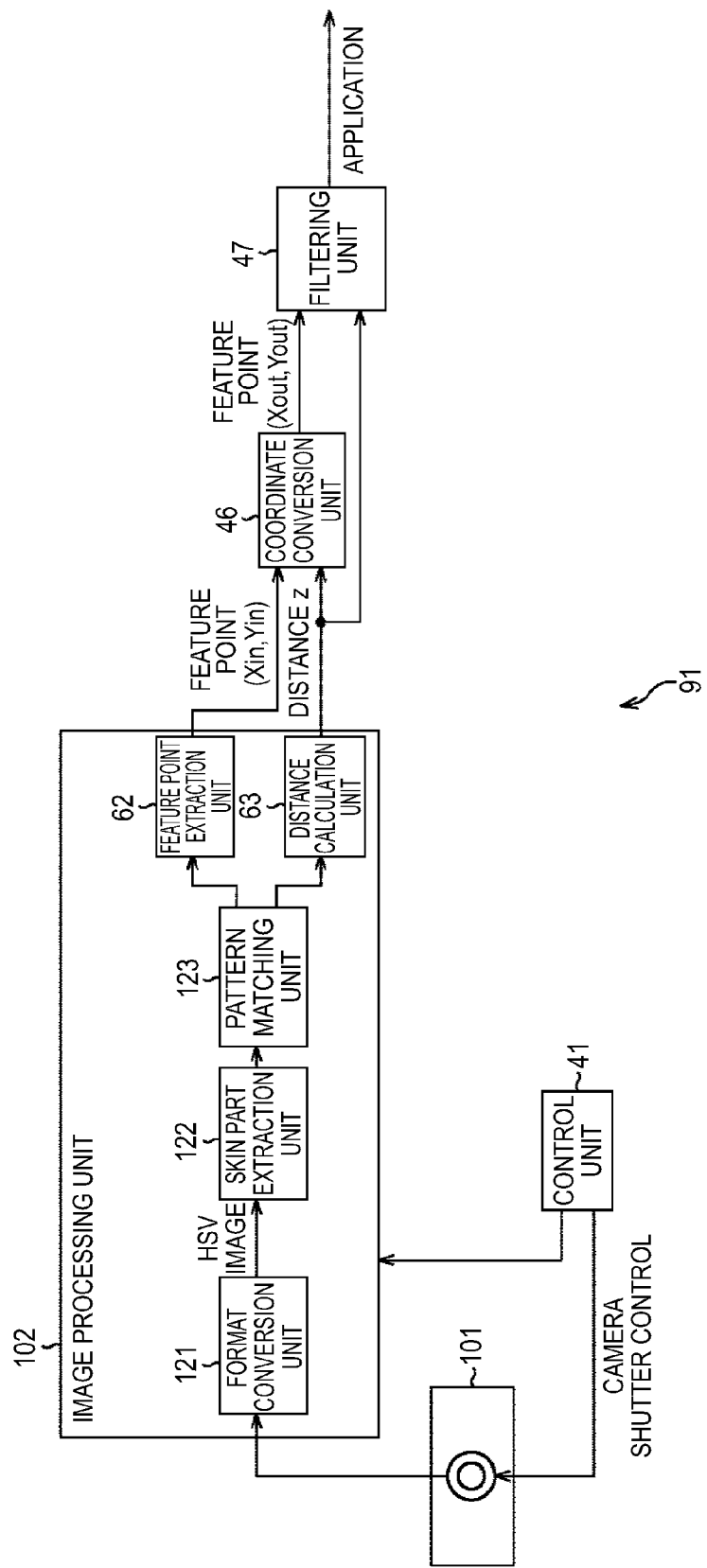
FIG. 13 is a block diagram illustrating a second configuration example of a detection device according to an embodiment of the present disclosure.

Next, FIG. 13 shows a configuration example of a detection device 91 which detects a skin area based on an external light image obtained on the basis of light reflected from a subject to which external light is applied.

In the detection device 91, the parts corresponding to the detection device 21 in this embodiment are given the same reference numerals, and thus the description thereof will be appropriately omitted.

In other words, the detection device 91 is configured in the same manner as the detection device 21 except that a camera 101 is provided instead of the LED driver 42, the camera 43, and the LEDs 44a and 44b, and an image processing unit 102 is provided instead of the image processing unit 45.

The camera 101 supplies an external light image obtained by capturing an image of a subject to the image processing unit 102 under the control of the control unit 41.

The image processing unit 102 detects a skin area based on the external light image from the camera 101. The image processing unit 102 calculates and outputs the feature point $y_{in})_t$ and the distance $z_t$ in the same manner as the image processing unit 45.

The image processing unit 102 is configured in the same manner as the image processing unit 45 in FIG. 1 except that a format conversion unit 121, a skin part extraction unit 122, and a pattern matching unit 123 are provided instead of the skin area detection unit 61.

The format conversion unit 121 is supplied with the external light image from the camera 101. The format conversion unit 121 converts the external light image supplied from the camera 101 from an RGB image of pixel values constituted by RGB (red, green, blue) values to an HSV image of pixel values constituted by HSV (hue, saturation, value) values, and supplies the converted image to the skin part extraction unit 122.

The skin part extraction unit 122 extracts a skin color part area constituted by a skin color part from the HSV image as the external light image supplied from the format conversion unit 121, and supplies the extracted area to the pattern matching unit 123.

The pattern matching unit 123 detects a skin area from the skin color part area supplied from the skin part extraction unit 122 through pattern matching, and supplies the detected skin area to the feature point extraction unit 62 and the distance calculation unit 63.

As the pattern matching, there may be a pattern matching in which, for example, a feature amount indicating a feature of each area constituting the skin color part area is compared with a feature amount indicating a feature of a human finger tip or the like, and an area having a feature amount which is the most similar to the feature amount indicating the feature of the human finger tip or the like is detected as a skin area.

Configuration Example of Detection Device 131

Figure 14:
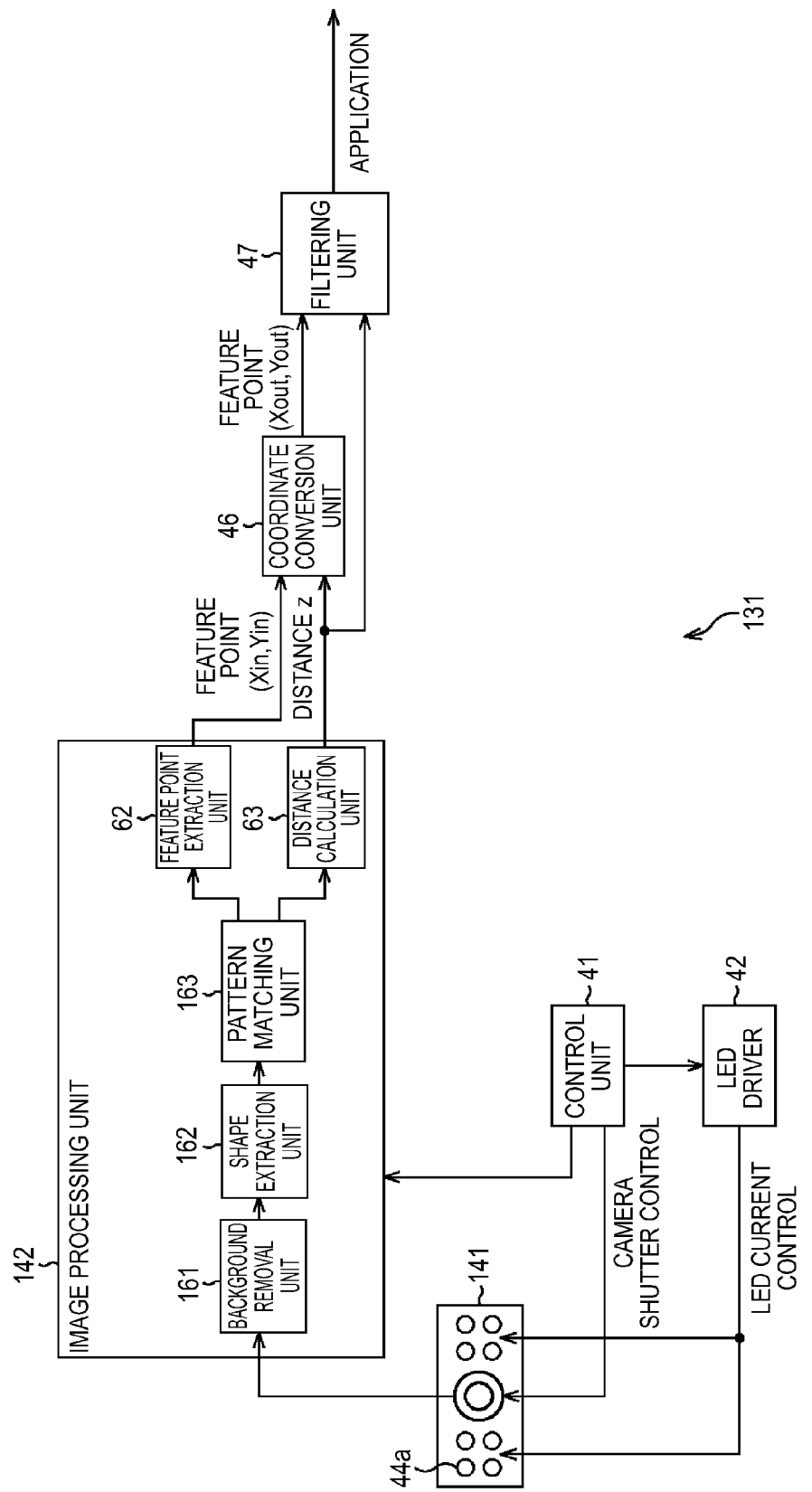
FIG. 14 is a block diagram illustrating a third configuration example of a detection device according to an embodiment of the present disclosure.

Next, FIG. 14 shows a configuration example of a detection device 131 which detects a skin area based on the first image obtained on the basis of light reflected from a subject to which light with wavelength λ1 is applied.

In the detection device 131, the parts corresponding to the detection device 21 in this embodiment are given the same reference numerals, and thus the description thereof will be appropriately omitted.

In other words, the detection device 131 is configured in the same manner as the detection device 21 except that a camera 141 having the LEDs 44a is provided instead of the camera 43 having the LEDs 44a and 44b, and an image processing unit 142 is provided instead of the image processing unit 45.

The LEDs 44a are repeatedly turned-on and turned-off under the control of the LED driver 42.

When the LEDs 44a are turned on, the camera 141 generates an illumination image based on light reflected from a subject to which light with wavelength λ1 is applied, and supplies the illumination image to the image processing unit 142. In addition, when the LEDs 44a are turned off, the camera 141 generates a non-illumination image based on light reflected from the subject to which only external light is applied, and supplies the non-illumination image to the image processing unit 142.

The image processing unit 142 detects a skin area based on the illumination image and the non-illumination image from the camera 141. The image processing unit 142 calculates and outputs the feature point $y_{in})_t$ and the distance $z_t$ in the same manner as the image processing unit 45.

The image processing unit 142 is configured in the same manner as the image processing unit 45 in FIG. 1 except that a background removal unit 161, a shape extraction unit 162, and a pattern matching unit 163 are provided instead of the skin area detection unit 61.

The background removal unit 161 receives the illumination image and the non-illumination image from the camera 141. The background removal unit 161 calculates a difference value obtained by subtracting a pixel value of the supplied non-illumination image, corresponding to a pixel value of the illumination image from the pixel value of the illumination image supplied together.

The background removal unit 161 removes a background from the illumination image based on whether or not the calculated difference value is equal to or more than a predetermined threshold value. In other words, for example, the background removal unit 161 removes an area corresponding to the difference value which is less than the predetermined threshold value, as the background, and supplies an area corresponding to the difference value which is equal to or more than the predetermined threshold value to the pattern matching unit 163 as a non-background area.

The shape extraction unit 162 extracts a shape of a skin part area from the non-background area supplied from the background removal unit 161, and supplies a skin color part area having the shape to the pattern matching unit 163.

The pattern matching unit 163 performs the same process as in the pattern matching unit 123 in FIG. 13 for the skin color part area from the shape extraction unit 162, and supplies a skin area obtained as a result thereof to the feature point extraction unit 62 and the distance calculation unit 63.

The above-described detection device 21 may be embedded in, for example, a television set or the like. In this case, in the television set, predetermined processes corresponding to the feature point $(x_{out}, y_{out})_t$ or the distance $z_t$ or the like output by the embedded detection device 21 are performed. This is also the same for the detection device 91 and the detection device 131.

Meanwhile, the above-described series of processes may be performed by dedicated hardware or software. When a series of processes is performed by the software, programs constituting the software are installed from a recording medium to a so-called built-in computer, or, for example, a general personal computer which can execute various kinds of functions by installing various kinds of programs.

Configuration Example of Computer

Figure 15:
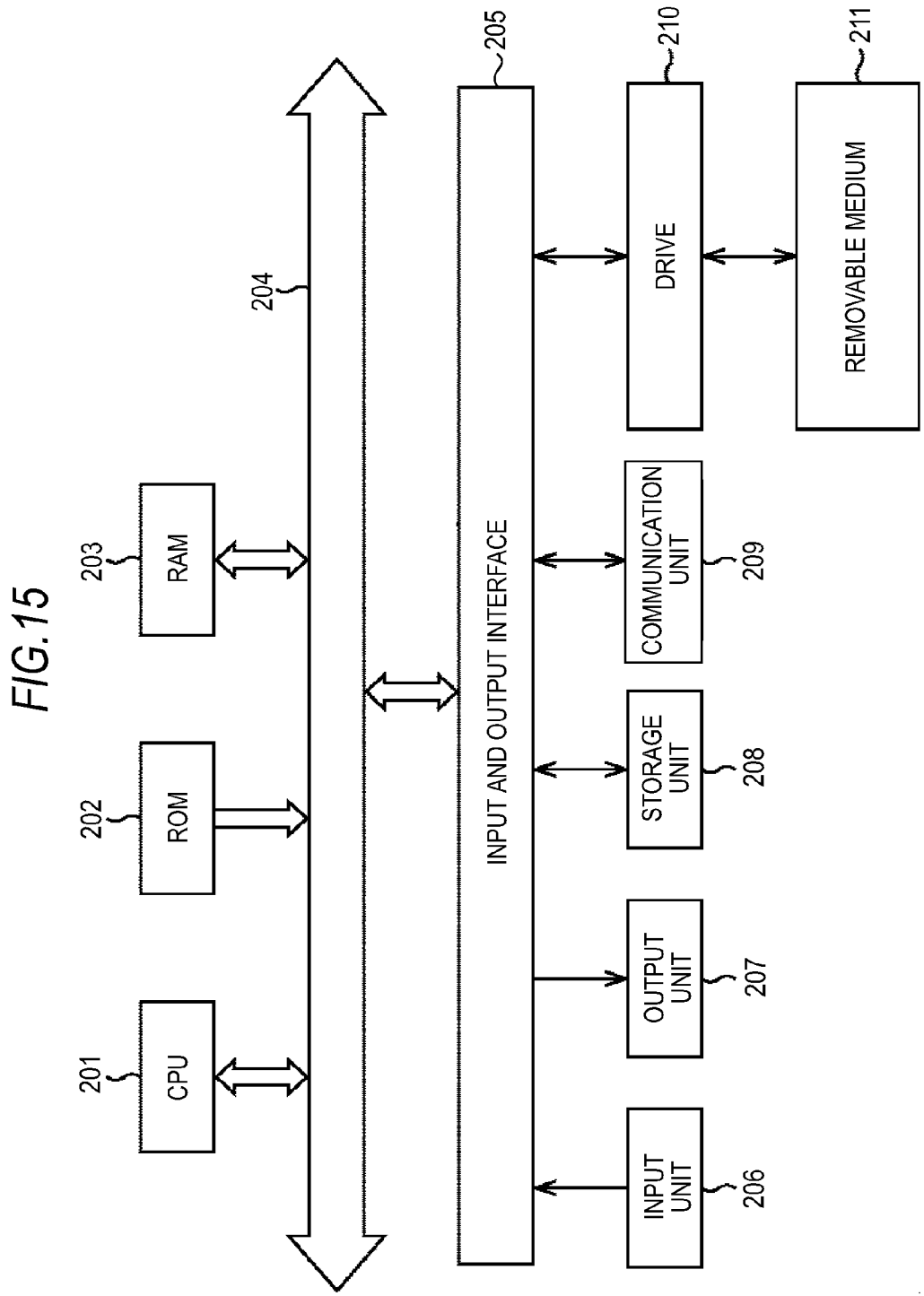
FIG. 15 is a block diagram illustrating a configuration example of a computer.

FIG. 15 is a block diagram illustrating a configuration example of a computer which executes the series of processes using a program.

A CPU (Central Processing Unit) 201 performs various kinds of processes according to a program stored in a ROM (Read Only Memory) 202 or a storage unit 208. A RAM (Random Access Memory) 203 appropriately stores programs or data performed by the CPU 201. The CPU 201, the ROM 202, and the RAM 203 are connected to each other via a bus 204.

The CPU 201 is connected to an input and output interface 205 via the bus 204. The input and output interface 205 is connected to an input unit 206 constituted by a keyboard, a mouse, and a microphone or the like, and to an output unit 207 constituted by a display, a speaker, and the like. The CPU 201 performs various kinds of processes in response to commands input from the input unit 206. The CPU 201 outputs a processed result to the output unit 207.

The storage unit 208 connected to the input and output interface 205 includes, for example, a hard disk, and stores programs or various kinds of data performed by the CPU 201. A communication unit 209 communicates with external devices via a network such as the Internet or a LAN.

A program may be obtained via the communication unit 209 and stored in the storage unit 208.

A drive 210 connected to the input and output interface 205 drives a removable medium 211 such as a magnetic disk, an optical disc, a magneto-optical disc or a semiconductor memory, when installed, and obtains programs, data, or the like recorded thereon. The obtained programs or data are transmitted to and stored in the storage unit 208 as necessary.

Recording media recording programs, which can be installed in a computer and be executed by the computer, include, as shown in FIG. 15, magnetic disks (including flexible disks), optical discs (including CD-ROMs (Compact Disc-Read Only Memory) and DVDs (Digital Versatile Discs)), magnetic optical discs (including MDs (Mini-Discs)), or the removable media 211 which are package media constituted by semiconductor memories or the like, or the ROM 202 or hard disks constituting the storage unit 208 which stores programs temporarily or permanently. Programs are optionally recorded on the recording media using a wired or wireless communication medium such as a LAN, the Internet, or digital satellite broadcasting, via the communication unit 209 which is an interface such as a router or a modem.

Further, in this specification, the steps for describing programs recorded on a recording medium include not only processes performed in a time series according to the described order, but also processes performed in parallel or separately even if not necessarily performed in the time series.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The application is claimed as follows:

1. An information processing device comprising:
   an image processing device configured to detect an image distance and a 3D position (x, y, z) of a subject from an image and extract a feature point from the subject in an (x, y) plane perpendicular to an image distance z-axis, wherein the image distance is a distance between the subject and where the image is captured; and
   a coordinate conversion unit configured to convert the feature point into a coordinate point in a coordinate space based on the image distance and a movement distance of the subject, wherein the coordinate conversion unit determines a conversion coefficient for converting the feature point into the coordinate point, and wherein the conversion coefficient is determined based on the image distance, and wherein the conversion coefficient is proportional to the image distance divided by a reference distance;
   wherein equal subject movement distances at different image distances correspond to a same coordinate movement distance in the coordinate space that includes the coordinate point.

2. The information processing device of claim 1, wherein the image processing device includes a skin area detection unit configured to detect a skin area of the subject from the image.

3. The information processing device of claim 2, further comprising:
   a first irradiation unit that irradiates the subject with light having a first wavelength;
   a second irradiation unit that irradiates the subject with light having a second wavelength longer than the first wavelength; and
   a generation unit that generates a first image based on reflection light from the subject, which is incident when light having the first wavelength is applied to the subject, and generates a second image based on reflection light from the subject, which is incident when light having the second wavelength is applied to the subject,
   wherein the detection unit detects the skin area of the subject based on the generated first and second images.

4. The information processing device of claim 2, wherein the image processing device includes a distance calculation unit configured to calculate the image distance based on a size of the skin area.

5. The information processing device of claim 2, wherein the image processing device includes a distance calculation unit configured to calculate the image distance based on a luminance value of the skin area.

6. The information processing device of claim 2, wherein the movement distance of the subject is a movement amount of the skin area.

7. An information processing method comprising:
   detecting an image distance and a 3D position (x, y, z) of a subject from an image;
   extracting a feature point from the subject in an (x, y) plane perpendicular to an image distance z-axis, wherein the image distance is a distance between the subject and where the image is captured; and
   converting, by a coordinate conversion unit, the feature point into a coordinate point in a coordinate space based on the image distance and a movement distance of the subject; and
   determining a conversion coefficient for converting the feature point into the coordinate point, wherein the conversion coefficient is determined based on the image distance, and wherein the conversion coefficient is proportional to the image distance divided by a reference distance;
   wherein equal subject movement distances at different image distances correspond to a same coordinate movement distance in the coordinate space that includes the coordinate point.

8. The information processing method of claim 7, further comprising:
   detecting a skin area of the subject from the image.

9. The information processing method of claim 8, further comprising:
   calculating the image distance based on a size of the skin area.

10. The information processing method of claim 8, further comprising:
    calculating the image distance based on a luminance value of the skin area.

11. The information processing method of claim 8, wherein the movement distance of the subject is a movement amount of the skin area.

12. A non-transitory computer readable storage medium storing a computer program, the computer program causing an apparatus to:
    detect an image distance and a 3D position (x, y, z) of a subject from an image;
    extract a feature point from the subject in an (x, y) plane perpendicular to an image distance z-axis, wherein the image distance is a distance between the subject and where the image is captured; and
    convert the feature point into a coordinate point in a coordinate space based on the image distance and a movement distance of the subject; and
    determine a conversion coefficient for converting the feature point into the coordinate point, wherein the conversion coefficient is determined based on the image distance, and wherein the conversion coefficient is proportional to the image distance divided by a reference distance;
    wherein equal subject movement distances at different image distances correspond to a same coordinate movement distance in the coordinate space that includes the coordinate point.

13. An electronic apparatus comprising:
    an information processing device including:
    an image processing device configured to detect an image distance and a 3D position (x, y, z) of a subject from an image and extract a feature point from the subject in an (x, y) plane perpendicular to an image distance z-axis, wherein the image distance is a distance between the subject and where the image is captured; and
    a coordinate conversion unit configured to convert the feature point into a coordinate point in a coordinate space based on the image distance and a movement distance of the subject, wherein the coordinate conversion unit determines a conversion coefficient for converting the feature point into the coordinate point, and wherein the conversion coefficient is determined based on the image distance, and wherein the conversion coefficient is proportional to the image distance divided by a reference distance;

wherein equal subject movement distances at different image distances correspond to a same coordinate movement distance in the coordinate space that includes the coordinate point.

14. The electronic apparatus of claim 12, further comprising:

an image capturing device, wherein the image distance is a distance between the subject and the image capturing device.

\* \* \* \* \*